United States Patent [19]
Okamoto et al.

[11] Patent Number: 5,697,064
[45] Date of Patent: Dec. 9, 1997

[54] MOBILE COMMUNICATIONS MONITOR SYSTEM

[75] Inventors: Naoko Okamoto, Ube; Takaaki Kawakami, Kawasaki, both of Japan

[73] Assignee: Fujitsu Limited, Kanagawa, Japan

[21] Appl. No.: 789,293

[22] Filed: Jan. 28, 1997

Related U.S. Application Data

[63] Continuation of Ser. No. 321,314, Oct. 11, 1994, abandoned.

[30] Foreign Application Priority Data

Mar. 18, 1994 [JP] Japan .................................. 6-087126

[51] Int. Cl.⁶ .................................................. H04B 7/24
[52] U.S. Cl. ........................ 455/53.1; 455/33.1; 379/59; 379/60
[58] Field of Search ............................. 455/33.1, 54.1, 455/54.2, 53.1, 33.4, 67.1, 56.1, 9; 379/58, 62, 63, 60, 59

[56] References Cited

U.S. PATENT DOCUMENTS

| | | | |
|---|---|---|---|
| 5,054,110 | 10/1991 | Comroe et al. | 455/33.1 |
| 5,095,500 | 3/1992 | Taylor et al. | 379/32 |
| 5,195,127 | 3/1993 | Ichikawa et al. | 379/58 |
| 5,235,633 | 8/1993 | Dennision et al. | 379/60 |
| 5,303,285 | 4/1994 | Kerihuel et al. | 379/58 |
| 5,357,561 | 10/1994 | Grube | 379/60 |

*Primary Examiner*—Reinhard J. Eisenzopf
*Assistant Examiner*—Lee Nguyen
*Attorney, Agent, or Firm*—Helfgott & Karas, P.C.

[57] ABSTRACT

The position of a mobile station is properly monitored and is stored in a home location register. A call which indicates this mobile station as a calling/receiving station is set via any mobile service switching center. When monitoring a communication oriented by this call is necessary, the subscriber number of this mobile station is input by a test work station. Based on this subscriber number, an operation and maintenance center reads position data of the mobile station from the home location register and reports the data to the test work station. Based on the position data, the test work station specifies the mobile service switching center through which the call has been set, and transfer data specifying this mobile service switching center to the operation and maintenance center. The operation and maintenance center extracts the call-oriented voices from this mobile service switching center.

10 Claims, 17 Drawing Sheets

FIG. 3

| PRN NUMBER | MSC NUMBER |
|---|---|
| PRN 1 | MSC 1 |
| PRN 2 | MSC 2 |
| ⋮ | ⋮ |

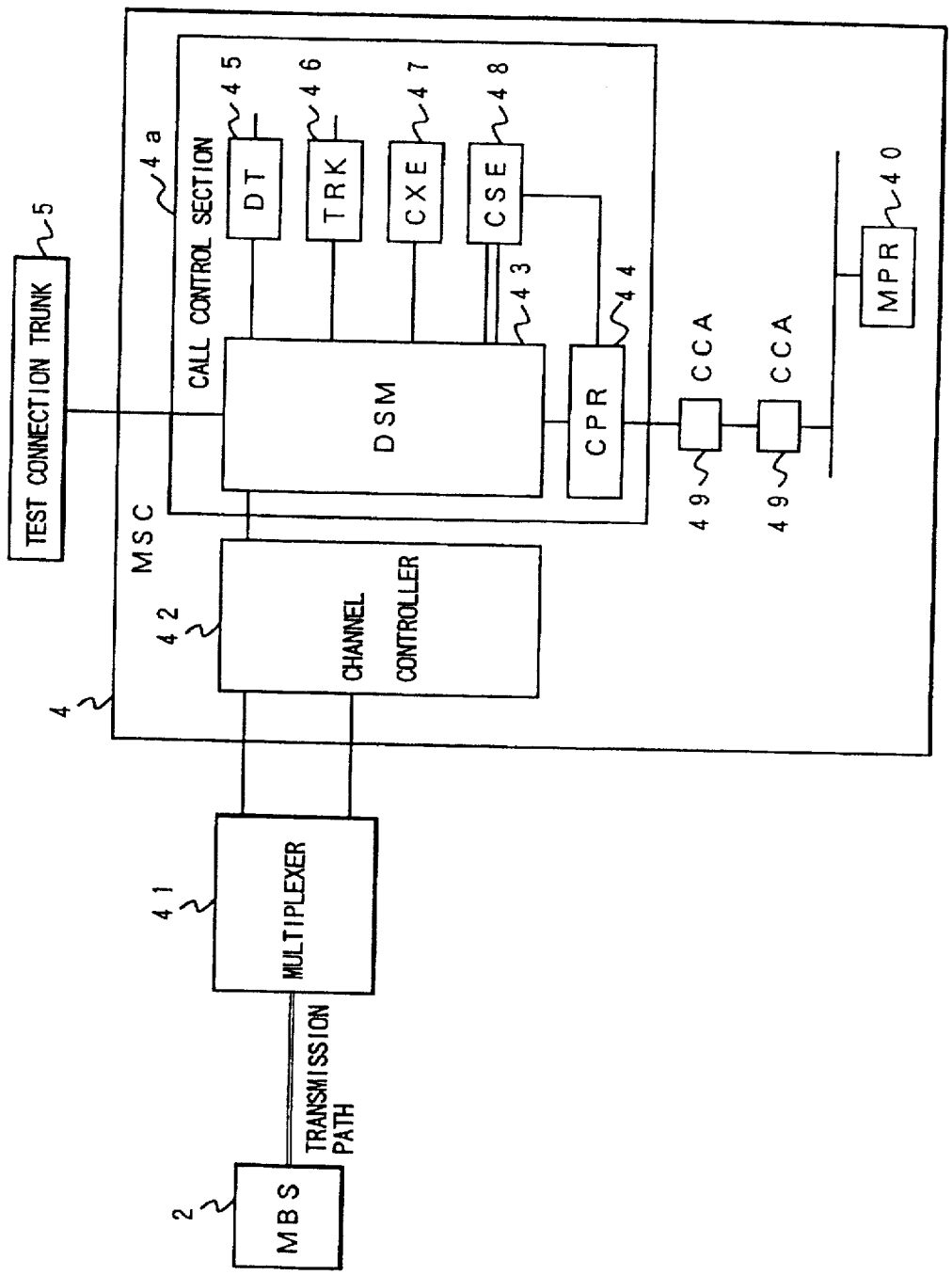
F I G. 5

FIG. 12

| PRN NUMBER | MSC NUMBER |
|---|---|
| PRN1 | MSC1 |
| PRN2 | MSC2 |
| ⋮ | ⋮ |

FIG. 15

| PRN NUMBER | MSC NUMBER |
|---|---|
| PRN 1 | MSC 1 |
| PRN 2 | MSC 2 |
| ⋮ | ⋮ |

MOBILE COMMUNICATIONS MONITOR SYSTEM

This is a continuation of application Ser. No. 08/321,314, filed Oct. 11, 1994, abandoned.

BACKGROUND OF THE INVENTION

1. Field of the Invention

The present invention relates to a system of monitoring the contents of communications in a mobile communications system.

2. Description of the Related Art

Recently, mobile communications monitor systems, such as automobile telephones system, portable telephones system and harbor radio telephones system, are growing. FIG. 17 schematically shows one example of the structure of such a mobile communications system. The system shown in FIG. 17 conforms to the NTT mobile communications system.

In FIG. 17, a mobile station (MS) 106 is a user terminal like an automobile telephone or portable telephone. To receive a radio wave transmitted from this mobile station 106 or to transmit a radio wave to this mobile station 106, a plurality of mobile base stations (MBS) 105 are positioned at given distances within the service area where the mobile communications service by this mobile communications system is provided. A mobile service switching center (MSC) 100, which controls those mobile base stations 105, is connected to those stations 105. This mobile service switching center 100 sets radio channels, instructs the switching of the radio channels, performs remote monitoring and control of the mobile base stations 105, and monitors and controls the radio channels. In this mobile communications system, a plurality of mobile service switching centers 100 are connected to an unillustrated automobile switching center (AMC). It is therefore possible to establish channels between each mobile service switching center 100 and a fixed telephone exchange network and between the individual mobile service switching centers 100 through this automobile switching center.

All of the mobile service switching centers 100 are connected to a single operation and maintenance center (OMC) 102. This operation and maintenance center 102 is connected to a test work station (TWS) 103 and a home location register (HLR) 104. The operation and maintenance center 102 executes various maintenances and monitoring on the entire mobile communications system in accordance with the operation of the test work station 103.

The home location register 104 stores information about the current location of each mobile station 106. As the mobile station 106 is movable, unlike a terminal and an end office in fixed telephone exchange network system, the mobile station 106 and the mobile base station 105 do not have a fixed relation. To call a specific mobile station 106, therefore, radio waves having a call signal superimposed thereon are transmitted from all the mobile base stations 105 in whose radio zones (where radio waves can reach) the mobile station 106 is likely to be located. The simultaneous transmission of call signals from a plurality of mobile base stations 105 is called "simultaneous calling." To reduce the number of mobile base stations 105 which perform this simultaneous calling, the positions of the stand-by mobile stations 106 should be detected in advance. The results of the positional detection are registered in the home location register 104. The information to be registered in the home location register 104 is position data that indicates in which control zone (unit area for simultaneous calling) each mobile station 106 is located. When the mobile station 106 moves out of certain control zone, communications are performed to update the position data registered in the home location register 104. To reduce the number of the communications for data renewal, each control zone has a range that covers the communications areas of a plurality of mobile base stations 105. The range of the control zone matches with the Lange of a service area each mobile service switching center 100 covers.

In the AMPS/Dyna TAC system that is employed in the U.S.A., a cell site (CS) is provided in place of the mobile base station 105 and a mobile telephone switching office (MTSO) is provided instead of the mobile service switching center 100. This system does not however have an automobile switching center which controls a plurality of mobile telephone switching offices 100. Therefore, each mobile telephone switching office is connected directly to an end office (EO) of a fixed telephone exchange network.

In the NORDIC system employed in the four Scandinavian countries, Sweden, Finland, Norway and Denmark, a base station (BS) is provided in place of the mobile base station 105 and a mobile telephone exchange (MTX) is provided in place of the mobile service switching center 100. This system however has no automobile switching center which controls a plurality of mobile telephone exchanges. Therefore, each mobile telephone exchange is connected directly to a short distance transit center (NFS) of a fixed telephone exchange network.

Since those mobile communications systems execute communications via radio waves, the deterioration of the quality of communications due to the use conditions and positional relations with the mobile base stations 105 is inevitable. It is thus necessary to properly monitor the communication states by this mobile communications system to watch any quality deterioration and to improve the deterioration factors if the quality deterioration has occurred. Specifically, it is necessary to extract voice signals transmitted from the mobile station 106 that is to be monitored from the various signals.

To perform the monitoring (voice extraction), the exchange establishes 1:2 connection. In the mobile communications system, the mobile service switching center 100 corresponds to an exchange at the far end. To extract voice signals transmitted from the mobile station 106 to be monitored from the various signals, the mobile service switching center 100 which controls the calling of this mobile station 106 should be specified.

Recent mobile communications systems employ the remote call control described in "Remote Call Control in Mobile Communications Networks," by Sawada et al. in Electronic Information Communications Committee, Spring Session, 1990, as the system for switching channels between mobile service switching centers 100 to cope with the movement of the mobile station 106 during communication. In this remote call control system, the role of the mobile service switching center 100 is separated into an anchor and a drift. The drift is the role of the mobile service switching center 100 when the call-set mobile station 106, which is the switching target, is located in the service area thereof and is directly connected to the mobile service switching center 100 via the mobile base station 105 under the supervision of this center 100. The anchor is the role of the mobile service switching center 100 which relays a call between a higher-rank exchange or a fixed exchange network and the drift and executes the calling control from the setting of a call to the extinction of the call. The roles of the anchor and drift exist in the same mobile service switching center 100 at the time a call is set. The mobile service switching center 100 which serves as both the anchor and drift is the switching center 100 whose service area is the control zone registered in the home location register 104 as the current position of this mobile station 106. When the mobile station 106 moves during communication, the role of the drift is shifted to another mobile service switching center 100 one after another according to the movement of the mobile station 106, while the role of the anchor is fixed to the original mobile service switching center 100. This anchor knows the position of the drift (the mobile service switching center 100 which is serving as the drift). But, the location of the drift is not registered in the hole location register 104.

To continuously monitor the communications of a specific mobile station 106 until the extinction of the call, the mobile service switching center 100 which serves as the anchor, not the drift, is specified. By the way, the mobile service switching center 100 which serves as the anchor is determined for each call. Thus, to monitor the communications of one mobile station 106, it is investigated which mobile service switching center 100 is playing the role of the anchor. The anchor is specified by the home location register 104 based on the subscriber number of the mobile station 106 to be monitored and the position data stored in this register 104.

In view of the above, the conventional mobile communications monitor systems established connection between the mobile service switching center 100 as the anchor and the monitoring work station 103 according to the following procedures.

As a maintenance personnel or an operator first inputs the subscriber number of the mobile station 106 to be monitored to the test work station 103 (①), a command to investigate the location of the mobile station 106 is issued to the operation and maintenance center 102 as apparent from the numbered sequence in FIG. 17.

The operation and maintenance center 102 which has received this command starts a task of investigating the position of the mobile station 106. The operation and maintenance center 102 accesses the home location register 104 and searches the subscriber data registered in this register 104 based on the subscriber number included in the received command. The operation and maintenance center 102 acquires the position data (PRN) corresponding to the subscriber number as the searching result (②), and displays the position data (PRN) on the display of the test work station 103.

When the position data (PRN) is displayed on the display of the test work station 103, the operator discriminates the mobile service switching center 100 whose service area contains the position indicated by this position data (PRN). After the discrimination, the operator should establish a communications channel between a test connecting trunk (STAP) 101 connected to the discriminated mobile service switching center 100 and the test work station 103, via the line from the test work station 103 to the operation and maintenance center 102 and the discriminated mobile service switching center 100. Therefore, the operator designates the number of the discriminated mobile service switching center 100 (hereinafter, which is called "center designation") and sends a connection request command which requests the connection between the test work station 103 and the test connecting trunk 101 (③) of the designated mobile service switching center 100.

This connection request command is sent via the operation and maintenance center 102 to the designated mobile service switching center 100. Upon reception of this connection request command, the mobile service switching center 100 performs the connecting process. When the connecting process is complete, a connection complete notification is sent to the operation and maintenance center 102. The operation and maintenance center 102 sends this connection complete notification as a center designation complete notification to the test work station 103.

When this center designation complete notification is received by the test work station 103 and is displayed on the display thereof, the operator sends the subscriber number of the mobile station 106 to be monitored. Then, the mobile service switching center 100 searches the call control data for trunk and path data and extracts voice signals included in the communication carried out by the mobile station 106 from all signals. Then, the voice signals are transmitted to the operation and maintenance center 102 from the STAP 101. As a result, a voice can be output from the test work station 103.

According to the conventional mobile communications systems, however, as described above, the process for inquiring the position data and the process for connecting the STAP 101 and the test work station 103 are independent processes. This requires that the operator should perform three manual operations, inquiry on the position data (first manual operation), center designation (second manual operation) and setting of other information (third manual operation), to monitor the mobile station 106 of interest. Apparently, the conventional mobile communications systems cannot easily monitor mobile communications.

SUMMARY OF THE INVENTION

It is therefore an object of the present invention to provide a mobile communications monitor system which can reduce the number of input works on a terminal performed by a maintenance personnel.

To achieve the above object, a mobile communications monitor system according to this invention comprises a plurality of exchanges for communicating with an arbitrary mobile station and for relaying the communication with said mobile station; a monitor device, connected to the plurality of exchanges, for extracting contents of communications relayed by the connected exchanges; mobile-station specifying data input device for inputting specifying data of a mobile station to be monitored, into the monitor device, and position data storage device, connected to the monitor device, for storing position data specifying locations of the mobile station, whereby when receiving the position data through the mobile-station specifying data input device, the monitor device reads position data of a mobile station, corresponding to the input specifying data, from the position data storage device, specifies an exchange whose service area covers a position indicated by the read position data, and extracts the content of a communication with the mobile station corresponding to the mobile-station specifying data from the specified exchange.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

FIG. 3 is a diagram showing an MSC conversion table stored in a test work station in FIG. 2;

FIG. 5 is a block diagram showing the specific structure of a mobile service switching center;

FIG. 8 is a time arrow diagram illustrating monitor connecting procedures that are executed by the mobile communications system shown in. FIG. 2;

FIG. 12 is a diagram showing an MSC conversion table stored in an operation and maintenance center in FIG. 11;

FIG. 15 is a diagram showing an MSC conversion table stored in a mobile service switching center (MSC #1) in FIG. 14;

DETAILED DESCRIPTION OF THE PREFERRED EMBODIMENTS

Preferred embodiments of the present invention will now be described with reference to the accompanying drawings.

First Embodiment

Figure 1:
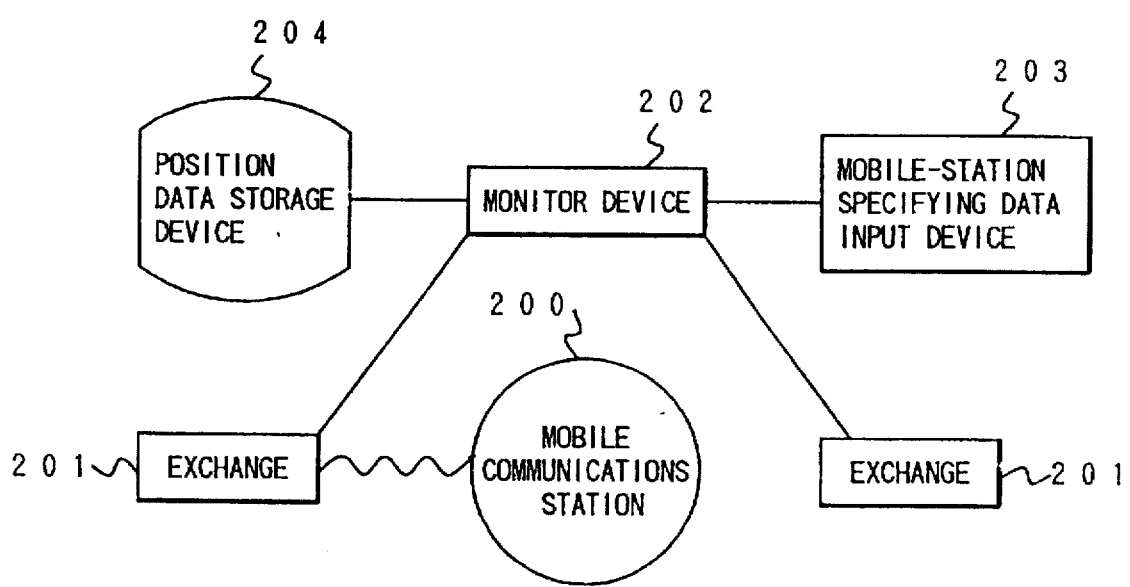
FIG. 1 is a schematic diagram showing the schematic structure of a mobile communications system for which a mobile communications monitor system according to a first embodiment of the present invention is adapted.

FIG. 1 is a schematic diagram of a mobile communications system for which a mobile communications monitor system according to a first embodiment of the present invention is adapted.

In this mobile communications system, a plurality of exchanges 201 are connected to an unillustrated higher-rank exchange or fixed communications network. Each exchange 201 has a service area (control zone). Each exchange 201 can establish a channel with a mobile communications station 200 located in its own service area via radio waves. Each exchange 201 relays a communication calling from the channel-established mobile communications station 200 to the unillustrated higher-rank exchange or fixed communications network.

Connected to all the exchanges 201 that constitute the mobile communications system is a monitor device 202 which monitors the contents of communications relayed to the individual exchanges 201. Connected to the monitor device 202 is a position data storage device 204 which stores position data specifying the location of any communicating mobile communications station 200 to be monitored. Further connected to the monitor device 202 is a mobile-station specifying data input device 203 which accepts the inputting of specific data specifying the mobile communications station 200 to be monitored.

The mobile communications monitor system according to this embodiment can be adapted for use in all the mobile communications systems employed in the countries in the world. Therefore, this mobile communications monitor system can be adapted for mobile communications systems which may be developed in the future as well as all the mobile communications systems which are currently used in Japan, the United States and the aforementioned four Scandinavian countries. That is, the exchange 201 in this embodiment is equivalent to the mobile base station (MBS) and mobile control station (MCS) in the Japanese system, to a cell site (CS) and mobile telephone switching office (MTSO) in the U.S. AMPS/Dyna TAC system and to a base station (BS) and mobile telephone exchanger (MTX) in the Scandinavian NORDIC system.

The mobile communications system according to this embodiment can be any system as long as all or a part of relay paths between the mobile communications stations 200 and exchanges 201 are established by radio channels. Therefore, this mobile communications system includes all the communications systems that use automobile telephones, portable telephones, harbor radio telephones, aircraft telephones, train telephones, etc.

The communication data that is used in the mobile communications system of this embodiment is not limited to a particular type; it may be an analog type or a digital type.

The details of the individual blocks in FIG. 1 will be described below.

Mobile Communications Station

The mobile communications station 200 includes every type of terminal, such as an analog telephone, digital telephone, facsimile, modem and computer. Each terminal should not necessarily incorporate a radio transmitter/receiver. Such a radio transmitter/receiver may be provided separate from each terminal as long as they constitute a mobile communications station as a whole.

Exchange

The exchange 201 may be designed to be able to execute radio communication with any mobile communications station 200 by itself or may be separated into a unit having the exchanging function and a radio unit. In the latter case, a plurality of radio units may be connected to one unit having the exchanging function. This way, a mobile communications system of a small zone type can be accomplished. In this case, a plurality of radio units may be temporarily grouped into one by a multiplexer and then connected to a unit having the exchanging function.

It is possible to build a mobile communications system which includes a plurality of such exchanges 201. In this case, those exchanges 201 may be connected to one another like a network or may be grouped together by a higher-rank exchange. Further, the exchanges may be mutually connected by a fixed communications network (telephone network, packet switching network, ISDN, etc.).

Monitor Device

The monitor device 202 has an ability to access the exchange 201 to monitor the statuses of the communications. In this case, since the mobile communications stations 200 include terminals which utilizes various kinds of media, the quality which is target of the monitoring include the audio quality (the presence/absence of noise, crosstalk or the like, the signal intensity, etc.), the quality of digital data (the presence/absence or level of a signal error, wave deformation or the like), and the quality of image data (data loss in facsimile communication).

This monitor device 202 and the exchange 201 may be fixedly connected together via a direct special line, or may be connected together via another exchange 201 or a switching network (communications network) as needed.

Mobile-station Specifying Data Input Device

The mobile-station specifying data input device 203 is the device to which data specifying a mobile communications station 200 is externally input. Thus, this mobile-station specifying data input device 203 may be a keyboard or another man-machine interface formed integrally with monitor means, or may be a terminal separate from the monitor means and connected thereto by a communications channel. This input device 203 may be equipped with a device which outputs monitoring voices. Alternatively, the monitor device 202 may be provided with such a voice output device.

Here, the mobile-station specifying data is data given to each terminal, such as the subscriber number terminal number.

Position Data Storage Device

The position data storage device 204 is a kind of a data base storing the current position data of each mobile communications station 200. When this storage device 204 is searched with the mobile-station specifying data inputted from the aforementioned mobile-station specifying data input device 203 as a key, position data corresponding to this mobile-station specifying data is read out specifically. This position data can have an arbitrary degree of precision. While the latitude/altitude data measured on a terminal side by means of GPS (Global Positioning System) may be transmitted to the position data storage device 204 via the exchange 201 when the highest precision is required, such a precision is not essential. For example, the position data may be data that specifies an exchange in whose service area each mobile communications station 200 is located. In this case, if the exchange 201 comprises a single unit having the exchanging function and a plurality of radio units as described above, the position data may specify the radio unit in whose radio zone the target mobile communications station 200 is located, or may specify the radio zone of which group of radio units the target mobile communications station 200 is located when the radio units are grouped.

Based on the thus obtained position data, the exchange 201, monitor device 202 or mobile-station specifying data input device 203 specifies the exchange 201 in whose control area the mobile communications station 200 to be monitored is located. For instance, when the monitor device 202 receives specifying data from the mobile-station specifying data input device 203, this monitor device 202 reads the position data of the mobile communications station 200 corresponding to the inputted specifying data from the position data storage device 204. The monitor device 202 specifies the exchange 201 whose service area covers the location indicated by the read position data, and extracts the content of a communication that is currently conducted by the mobile communications station 200, from the specified exchange 201.

In another example, when the monitor device 202 receives specific data mobile-station specific data input device 203, this monitor device 202 reads the position data of the mobile communications station 200 corresponding to the input specific data from the position data storage device 204. The monitor device 202 transmits the read position data to the mobile-station specifying data input device 203. Upon reception of this position data, the input device 203 specifies the exchange 201 whose service area covers the location indicated by the read position data, and informs the monitor device 202 of the specified exchange 201. Then, the monitor device 202 extracts the content of a communication that is currently conducted by the mobile communications station 200, from the informed, specified exchange 201.

In a different example, when the monitor device 202 receives specifying data from the mobile-station specifying data input device 203, this monitor device 202 transmits the received specifying data to one of the exchanges 201. The exchange 201 which has received this specifying data reads the position data of the mobile communications station 200 corresponding to the inputted specifying data from the position data storage device 204, specifies the exchange 201 whose service area covers the location indicated by the read position data, and informs the monitor device 202 of the specified exchange 201. Then, the monitor device 202 extracts the content of a communication that is currently conducted by the mobile communications station 200, from the informed specified exchange 201.

In any of the above cases, if any of the exchanges 201, monitor device 202 and mobile station specifying data input device 203, which specifies the exchange 201 of interest based on the position data read from the position data storage device 204, has the table that associates the position data with the exchanges 201, specifying the exchange 201 of interest is easy.

According to the thus constituted embodiment, a maintenance personnel or operator has only to input data specifying a mobile communications station first.

Second Embodiment

Structure of Mobile Communications System

Figure 2:
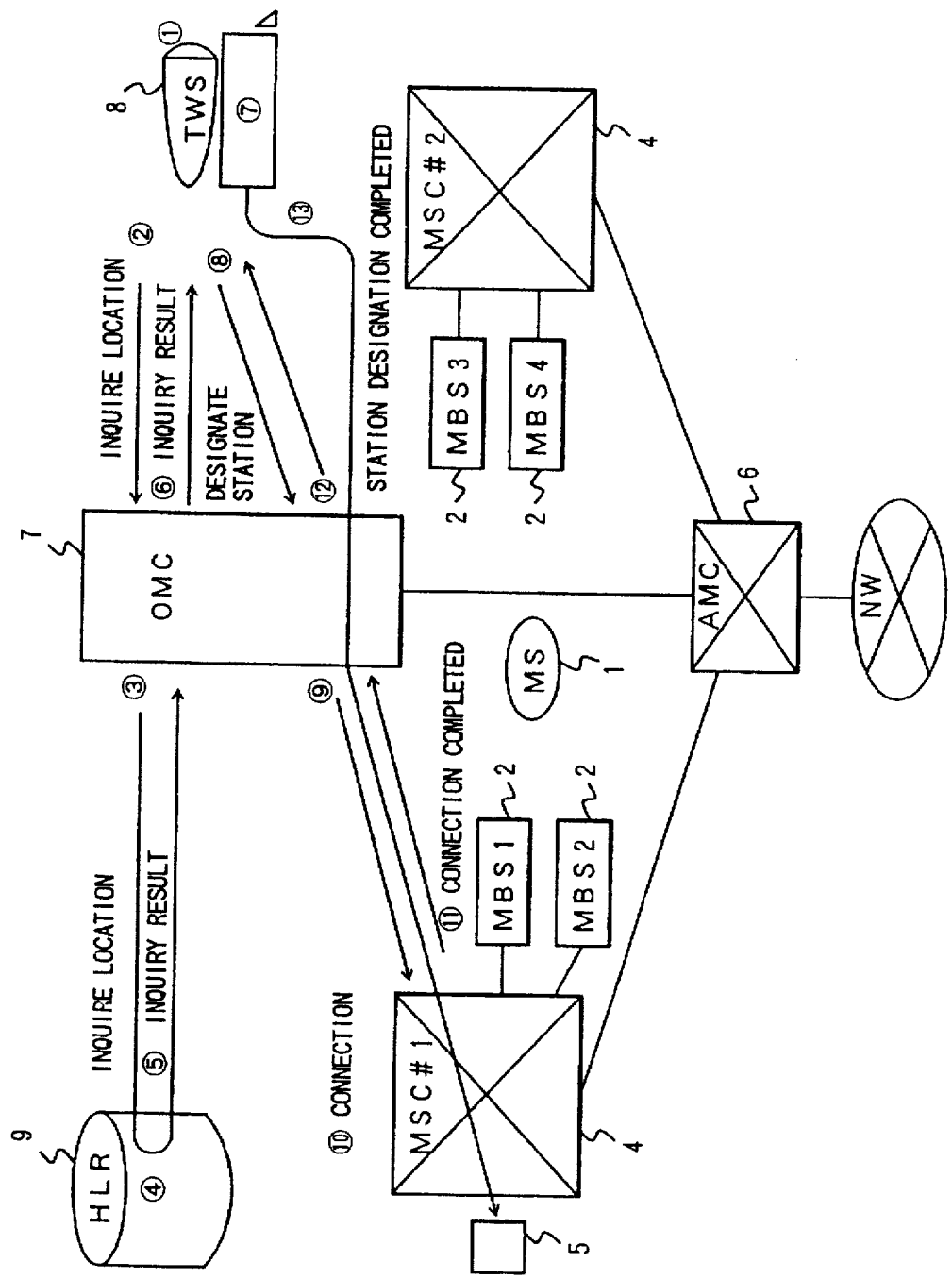
FIG. 2 is a schematic diagram showing the schematic structure of a mobile communications system for which a mobile communications monitor system according to a second embodiment of the present invention is adapted.

FIG. 2 is a schematic diagram of a mobile communications system for which a mobile communications monitor system according to a second embodiment of the present invention is adapted. In the second embodiment, the mobile communications system in which this invention is embodied the system of Nippon Telegraph and Telephone Corporation (NTT) currently used in Japan. This NTT system mainly comprises an automobile switching center (AMC) 6 connected to an unillustrated radio center (RC) of a fixed communications network (NW), a plurality of mobile service switching centers (MSC) 4 connected via relay channels to this automobile switching center 6, and a plurality of mobile base stations (MBS) 2 connected via connecting lines to the individual mobile service switching centers 4. This system structure allows communications between mobile stations 1 located within a service area of the system and between any mobile station and a fixed telephone. This mobile communications system is a so-called small-zone system.

In this mobile communications system, a single operation and maintenance center (OMC) 7 is connected to all the mobile service switching centers 4 via the automobile switching center 6. Connected to this operation and maintenance center 7 are a test work station (TWS) 8 and a home location register (HLR) 9.

The individual portions constituting this mobile communications system will now be discussed in detail.

Operation and Maintenance Center

The operation and maintenance center 7 as a monitor device can monitor the contents of communications executed via the individual mobile service switching centers 4. The operation and maintenance center 7 accesses the each mobile service switching center 4 in accordance with a command from the test work station 8. The operation and maintenance center 7 enters the channel of the communication executed by the mobile station 1 designed by the test work station 8, making 1:2 connection. The operation and maintenance center 7 extracts voice signals in this communication. Further, the operation and maintenance center 7 accesses the home location register 9 in accordance with a command from the test work station 8 to retrieve the position data about the mobile station 1 from the register 9.

Test Work Station

Figure 3:
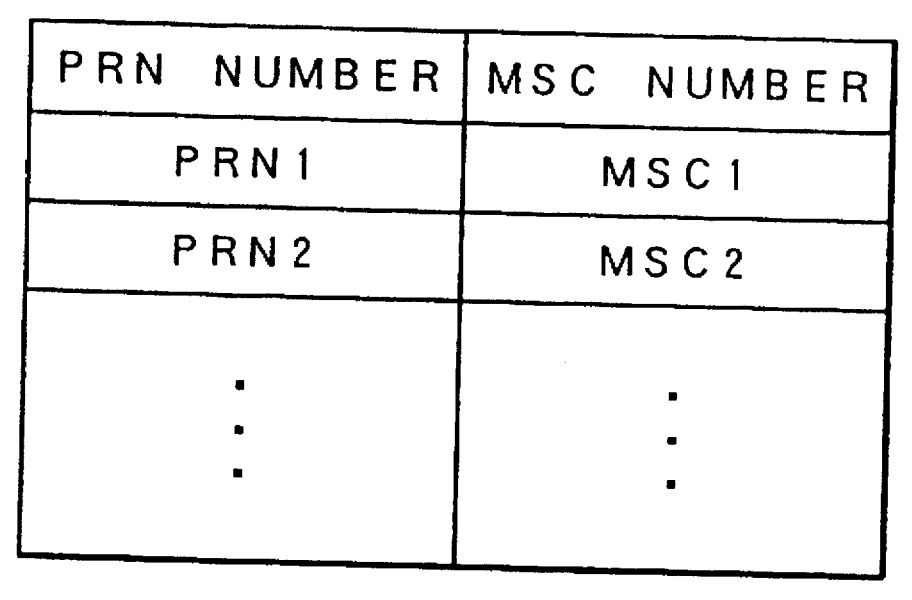

The test work station 8 as the mobile-station specifying data input device is a work station which is equipped with a computer body, a keyboard and a display. This test work station 8 receives the subscriber number of the mobile station 1 to be monitored by the operator and transmits this subscriber number to the operation and maintenance center 7. Based on the position data informed by the operation and maintenance center 7, the test work station 8 automatically retrieves the mobile service switching center 4 which covers the area indicated by this position data, and returns the retrieval result to the operation and maintenance center 7. The test work station 8 has a conversion table as shown in FIG. 3 to execute this retrieval. This conversion table has position data (PRN numbers (pursuit ruting numbers)) and MSC numbers (numbers of the mobile service switching centers 4) in one to one association. By searching this conversion table with a specific PRN number as a key, therefore, the MSC number associated with that PRN number can easily be retrieved.

Mobile Station

The mobile station (MS) 1 as a mobile communications station is a user terminal, such as an automobile telephone or a portable telephone. That is, this mobile station 1 generally has a power supply and a radio unit, which can transmit a control signal and a communications signal on a radio wave and can receive the control signal and communications signal superimposed on a radio wave transmitted from the mobil base station 2. This mobile station 1 can freely move outside the service area of the mobile communications system as well as within the service area.

Mobile Base Station The mobile base station 2 is a radio equipment which receives a radio wave from such a mobile station 1 and transmits a radio wave to the mobile station 1. To prevent radio waves transmitted from or received by a plurality of mobile base stations 2 from being mixed and to independently use a radio wave of the same frequency within a plurality of areas to increase the number of channels, each mobile base station 2 is designed in such a way that its output is suppressed to a relative low value (25 W) to narrow the radio zone which each mobile base station 2 covers and that a certain distance is secured between adjoining mobile base stations 2. The frequency band which each mobile base station 2 uses is given about 15 MHz for both transmission and reception. The number of subbands obtained by dividing this frequency band is the number of channels that each mobile base station 3 can establish.

Mobile Service Switching Center

Each mobile service switching center 4 as an exchange is connected to a regional group of mobile base stations 2 via a communications channel. Each mobile service switching center 4 controls the connected mobile base stations 2 and accommodates the channels of those mobile base stations 2.

When the mobile service switching center 4 receives a call establishing request from a mobile station 1 radio-connected to any mobile base station 2 under the control of this center 4 to establish communication with another mobile station 1 located in the radio zone of any mobile base station 2 also under its own control (the latter mobile base station 2 may be the same as the former one or may be different from the former one), the mobile service switching center 4 connects those mobile stations 1 together to permit communication between them. When the mobile service switching center 4 receives a call requesting the establishment of communication between a mobile station 1 located within its own radio zone and a mobile station 1 located within an area that is covered by another mobile service switching center or a fixed telephone, the mobile service switching center 4 establishes the communication via the automobile switching center 6.

Connected to this mobile service switching center 4 is a test connecting trunk (STAP) 5 which establishes 1:2 connection between the communications channel for a mobile station 1 and another terminal and maintenance center 7 when the operation and maintenance center 7 is monitoring.

Figure 4:
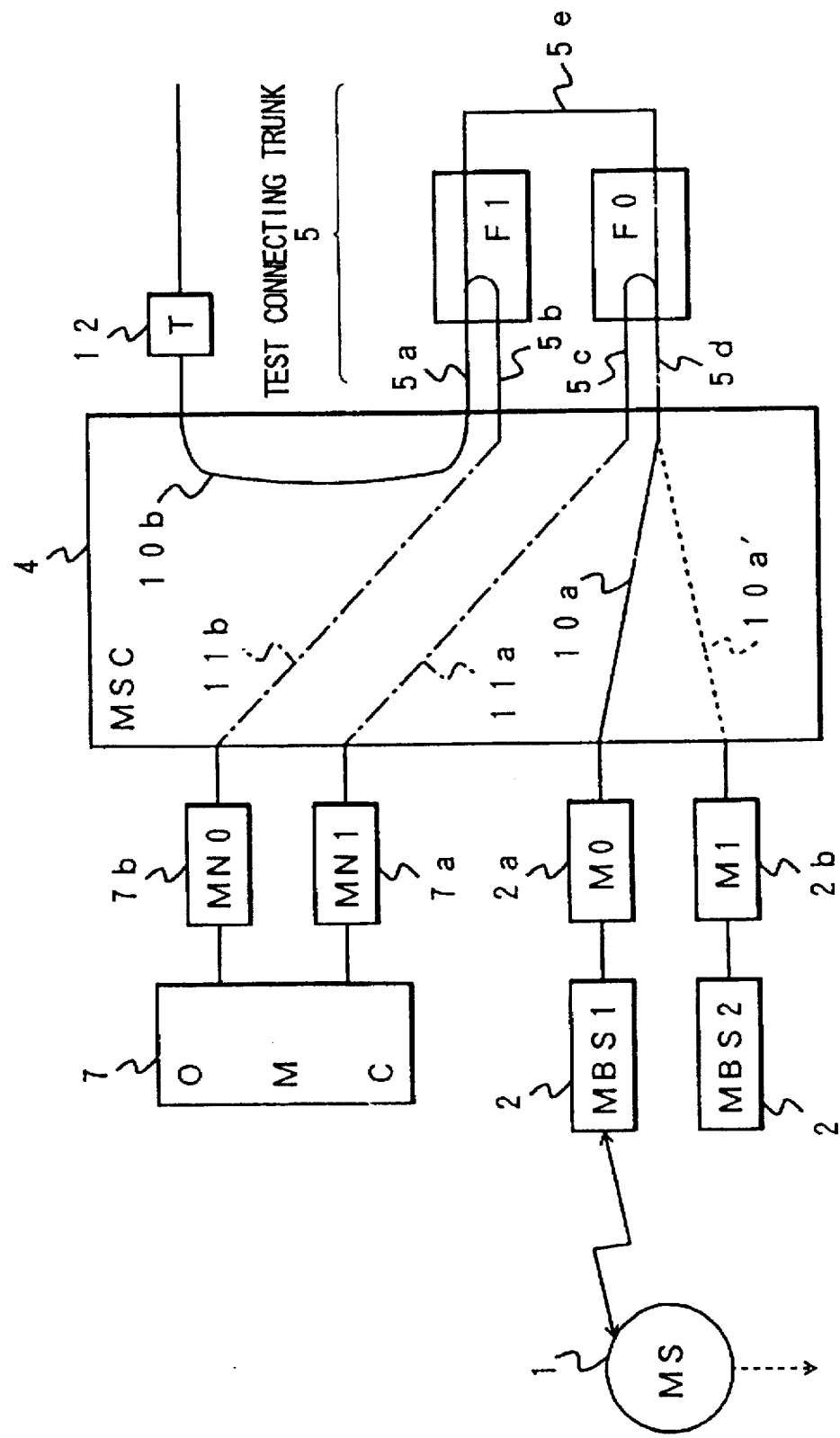
FIG. 4 is an explanatory diagram for explaining the function of a test connecting trunk.

FIGS. 4 through 7 illustrate the specific structures of the mobile service switching center 4 and the STAP 5. FIG. 4 shows the Structure which allows the mobile service switching center 4 and STAP 5 to establish 1:2 connection among a mobile station 1, the operation and maintenance center 7 and an unillustrated communication destination terminal to ensure the monitoring purpose. In FIG. 4, when a mobile station 1 generates a call for a fixed network NW via a trunk 12 for example, the mobile station 1 and the trunk 12 are connected to the STAP 5 under the control of the mobile service switching center 4. At this time, the mobile base station (MBS1) 2, a channel (M0) 2a, a path 10a, a terminal 5d of the STAP 5, a channel (F0), a return channel 5e, a channel (F1), a terminal 5a and a path 10b. To monitor communications conducted via this communications path, a path 11b for connecting a monitoring terminal 5b of the STAP 5 to a channel (MN0) 7 of the operation and maintenance center 7 and a path 11a for connecting a monitoring terminal 5c of the STAP 5 to a channel (MN1) 7a of the operation and maintenance center 7 are set in accordance with an instruction from the test work station 8. When the mobile station 1 moves to the radio zone of another mobile base station (MBS2) 2 while monitoring is conducted under this situation, channel switching is performed under the control of the mobile service switching center 4 to establish a path 10a' for connecting a channel (M1) 2b of the mobile base station (MBS2) 2 to the terminal 5d of the STAP 5. Even in this case, the paths 11a and 11b between the STAP 5 and the operation and maintenance center 7 are not changed, the monitoring operation continues.

FIG. 5 is a block diagram showing the more detailed structure of the mobile service switching center 4.

In FIG. 5, the mobile base station 2 that makes radio communication with the mobile station 1 in the radio zone thereof is connected to a channel controller 42 of the mobile service switching center 4 via a multiplexer 41 connected by a transfer path. This channel controller 42 is a time switch.

This channel controller 42 is connected to a call processor (CPR) 44 via a digital switch (DSM) 43 which is a space switch. As those channel controller 42 and digital switch 43 are controlled by the call processor 44, a call from a mobile station 1 or call reception at the mobile station 1 is controlled. Also connected to the digital switch 43 are the STAP 5, a digital trunk (DT) 45, a trunk (TRK) 46, a channel switching device (CXE) 47, etc.

The digital trunk 45 corresponding to the trunk 12 in FIG. 4 and trunk 46 are connected via a relay channel to another exchange. The transmission and reception of control signals from and at this another exchange are executed via the digital trunk 45 and trunk 46 under the control of a common channel signal processing device 48.

A main processor (MPR) 40 controls the call processor 44 via an interprocessor communication control apparatus (CCA) 49.

Figure 6:
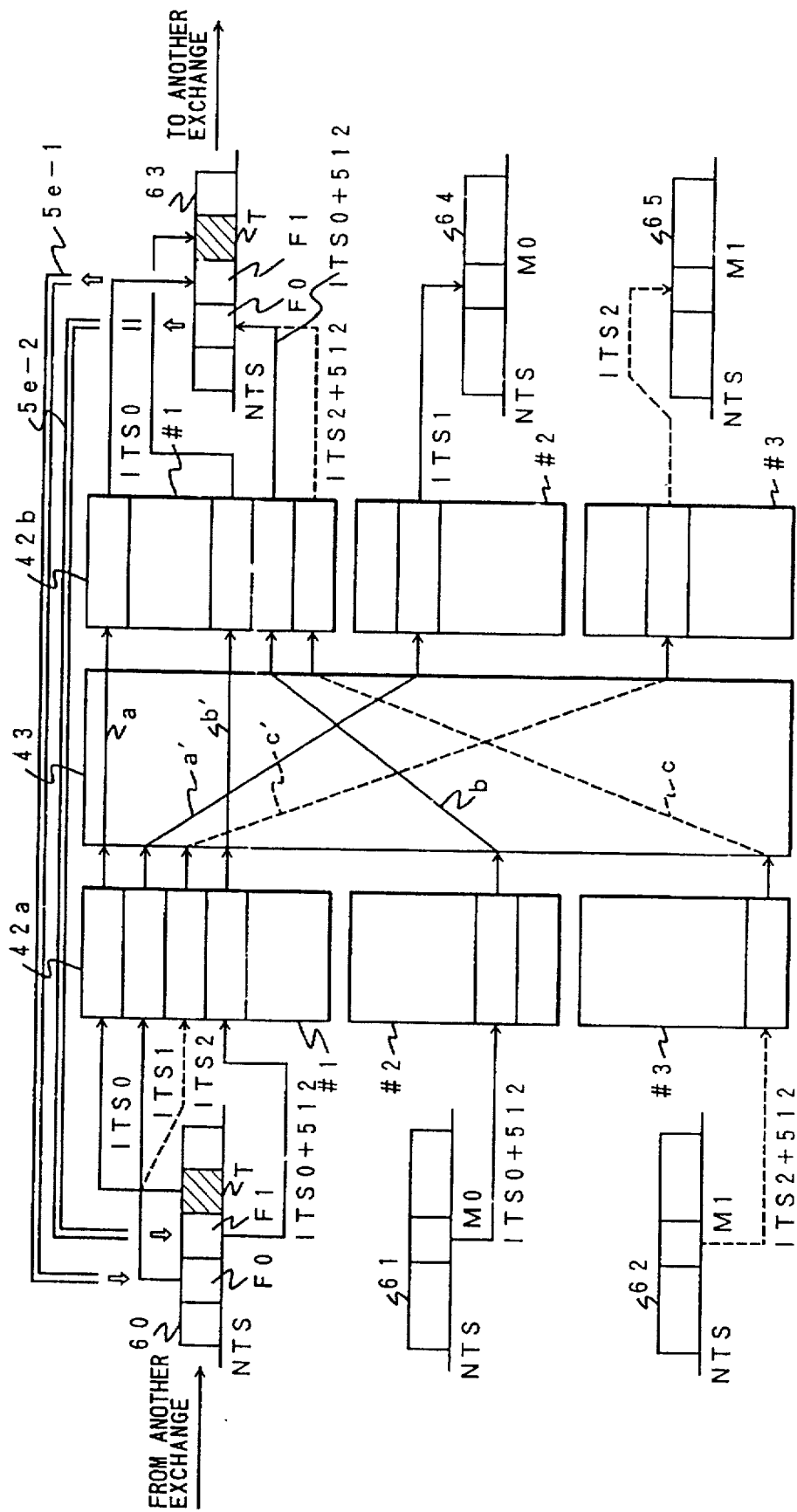
FIG. 6 is an explanatory diagram for explaining the switching in the mobile service switching center.

FIG. 6 is a block diagram showing the more detailed structures of the channel controller (primary channel controller 42a and secondary channel controller 42b) included in the mobile service switching center 4 and the digital switch 43. Reference numerals "60" to "62" denote network time slots (NTS) constituted by a plurality of time slots that are input to the individual switches #1, #2 and #3 of the primary channel controller 42a. Reference numerals "63" to "65" denote network time slots (NTS) constituted by a secondary of time slots that are input to the individual switches #1, #2 and #3 of the secondary channel controller 42b. The time slots M0 of the network time slots 61 and 64 are provided between the mobile base station 2 in whose radio zone the mobile station 1 has been located at the beginning of the communication and the mobile service switching center 4. The time slots M1 of the network time slots 62 and 65 are provided between the mobile base station 2 in whose radio zone the mobile station 1 which has moved after the communication is located and the mobile service switching center 4.

The network time slot 63 is provided with network returning time slots F0 and F1 as well as a time slot (indicated by T) for communication data in the downstream of the trunk (which is the direction of output signal to another exchange). The network time slot 60 is provided with network returning time slots F0 and F1 as well as a time slot (indicated by T) for communication data in the upstream of the trunk (which is the direction of input signal from another exchange).

The individual time slots F0 and F1 of the network time slot 63 are extracted on the output side of the secondary channel controller 42b. The extracted time slots F0, F1 are transferred to the input side of the primary channel controller 42a via the return connecting paths 5e-1 and 5e-2 of the STAP 5, and are inserted in the time slots F0 and F1 of the network time slot 60.

The upstream signal (communication data) input from another exchange is transferred by the time slot T of the network time slot 60. When this time slot T is input to the switch #1 of the primary channel controller 42a, the time slot in the switch #1 is switched to an inner time slot ITS0. Therefore, this communication data is transferred through the digital switch 43 and the secondary channel controller 42b via a path indicated by "a" and is input to the time slot F1 of the network time slot 63 on the output side. This time slot F1 is extracted in the manner mentioned above and is inserted in the time slot F0 of the network time slot 60 via the network return connecting path 5e-1. When this time slot F0 is input to the switch #1 of the primary channel controller 42a next, the time slot F0 in the switch #1 is switched to an inner time slot ITS1. Therefore, this communication data is transferred toward the network time slot 64 of the switch #2 of the. secondary channel controller 42b via a path indicated by "a'". The communication data of the inner time slot ITS1 is output in the time slot M0 to the network time slot 64 on the output side of the switch #2 and is sent to the mobile station 1 under the control of the secondary channel controller 42b.

The upstream signal from the mobile station 1 is input to the switch #2 of the primary channel controller 42a from the time slot M0 of the network time slot 61. This signal is so controlled as to be paired with the inner time slot ITS0 for the time slot T (trunk) from another exchange. That is, the signal is output in the inner time slot ITS0+512 to the time slot F0 of the network time slot 63 via the path b, passing the digital switch 43 and the switch #1 of the secondary channel controller 42b. This signal in the time slot F0 is extracted from the network time slot 63 and is inserted into the time slot F1 of the network time slot 60 via the network return connecting path 5e-2 of the STAP 5. Next, this signal is output in the inner time slot ITS0+512 to the time slot T (trunk) of the network time slot 63 from the primary channel controller 42a via the path b', passing through the digital switch 43 and the secondary channel controller 42b.

A description will now be given of the case where the mobile station 1 moves to the adjoining radio zone. In this example, suppose that the mobile station 1 has moved to the radio zone of the adjoining mobile base station 2, so that the communication which this mobile station 1 is making has been switched to the communication executed through this adjoining mobile base station 2. In this case, it is assumed that the upstream signal from the mobile base station 2 is connected to the mobile service switching center 4 by the time slot M1 of the network time slot 62. It is further assumed that the downstream signal from the mobile service switching center 4 is however connected to the mobile base station 2 by the time slot M1 of the network time slot 65. Accordingly, the mobile service switching center 4 switches the path of the switching device as indicated by the broken line in FIG. 4.

In other words, the signal coming from the time slot T of the network time slot 60 is input in the time slot F1 of the network time slot 63 through the same path as used before the mobile station 1 has moved. This signal is inserted in the time slot F0 of the network time slot 60 via the network return connection path 5e-1. Thereafter, the channel of the switch 1 of the primary channel controller 42a is switched to the inner time slot ITS2. A path c' is connected to the network time slot 65 which is the channel between the mobile base station 2 to which the mobile station 1 has moved and the mobile service switching center 4. Therefore, this signal is output to the channel by the time slot M1.

The upstream signal from the mobile station 1 is input to the switch #3 of the primary channel controller 42a from the time slot M1 of the network time slot 62. This signal is so controlled as to be paired with the inner time slot ITS2 as the aforementioned downstream inner time slot. In other words, this signal is transferred by the inner time slot ITS2+512 in the digital switch 43 via the path c. Then, this signal is input to the time slot F0 of the network time slot 63 from the switch #1 of the secondary channel controller 42b. Thereafter, this signal is extracted from the network time slot 63 in the same manner as done before the movement of the mobile station 1. The extracted signal is inserted into the time slot F1 of the network time slot 60 via the network return connecting path 5e-2 of the STAP 5, and is output to the time slot T of the network time slot 63 via the channel controllers 42a and 42b and the digital switch 43.

Figure 7:
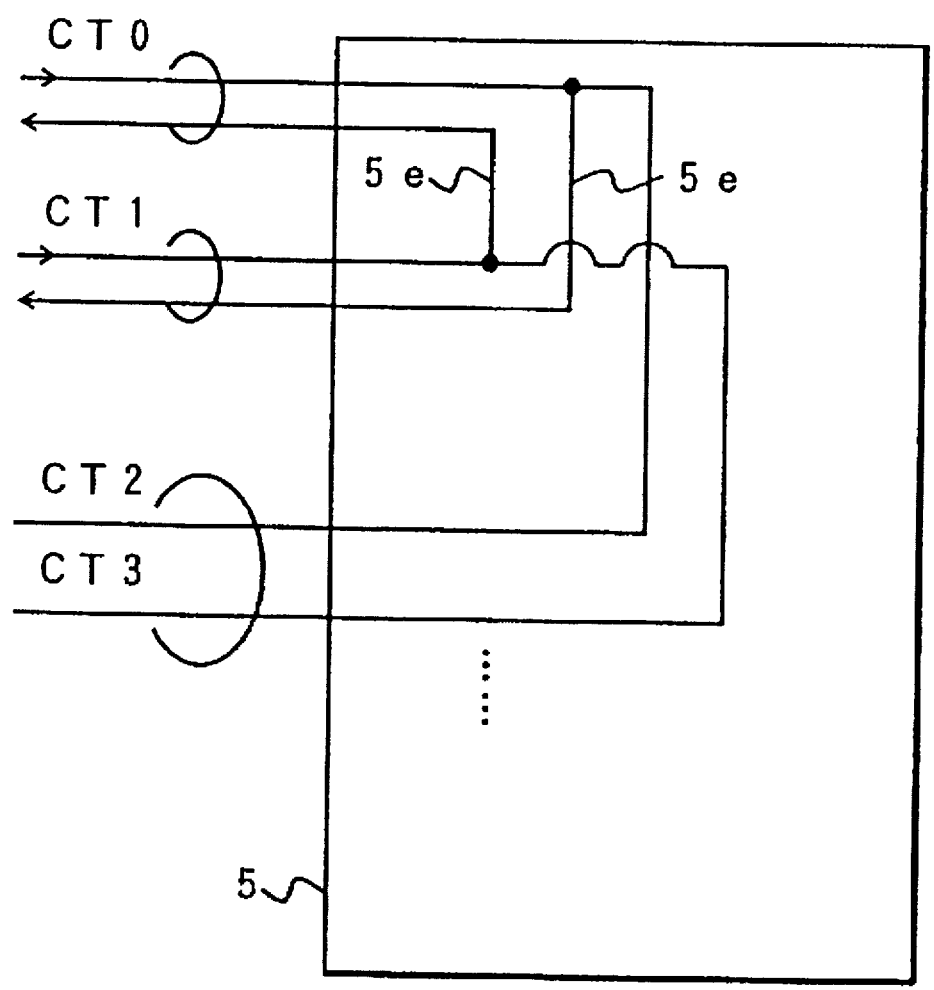
FIG. 7 is a diagram showing the specific structure of the STAP.

FIG. 7 is the interconnection diagram showing the more detailed structure of the STAP 5. "CT0" in this structure is a channel on which the communication data exchanged between the mobile service switching center 4 and the communication destination of the mobile station 1 appears. Likewise, "CT1" in this structure is a channel on which the communication data exchanged between the mobile service switching center 4 and the mobile station 1 appears. "CT2" and "CT3" are channels connected to the operation and maintenance center 7. The combinations of such channels CT0 to CT3 are provided by the number of monitor targets. At the same time a return connection for the bidirectional communications is made between the channels CT0 and CT1, therefore, the signals in the respective directions then are extracted onto the channel CT2 and CT3. As the extracted signals in the respective directions are supplied to the operation and maintenance center 7, the center 7 executes the monitoring.

Home Location Register

The home location register 6 as the position data storage means stores the position data of the mobile station 1. As the mobile station 1 is mobile, unlike a terminal and an end office in a fixed network, the mobile station 1 and the mobile base station 2 do not have a fixed relation. In calling a specific mobile station 1, therefore, it is necessary to send call signals from all the mobile base stations 2 in whose radio zones the mobile station is likely to be located or to execute the simultaneous calling. To reduce the number of mobile base stations 1 which perform this simultaneous calling, the positions of the stand-by mobile stations 1 are detected and the results are registered in the home location register 6. This registration is executed at the time the mobile station 1 is powered on. That is, at the same time the mobile station 1 is powered on, the mobile station 1 generates a registration request signal including data of the subscriber number) to the nearest mobile base station 2. The mobile base station 2 which has received this registration request signal sends the data to the home location register 9 via the operation and maintenance center 7. The home location register 9 which has received this data can recognize the position of the mobile station 1 by discriminating the mobile base station 2 that has transferred the data. To avoid the troublesome task of renewal, this position data is classified for each control zone which is a larger area and is stored in this form.

When the mobile station 1 moves out of one control zone, communication is conducted to update the position data registered in the home location register 6. More specifically, when the mobile service switching center 4 detects from the communication from a mobile station 1 that this mobile station 1 has moved out of the control zone where the mobile station 1 has been located first, the mobile service switching center 4 reports the control zone where the mobile station 1 has newly entered to the home location register 9. Upon reception of this communication, the home location register 9 updates the registered content.

Procedures of Setting Communication Monitor

Figure 8:
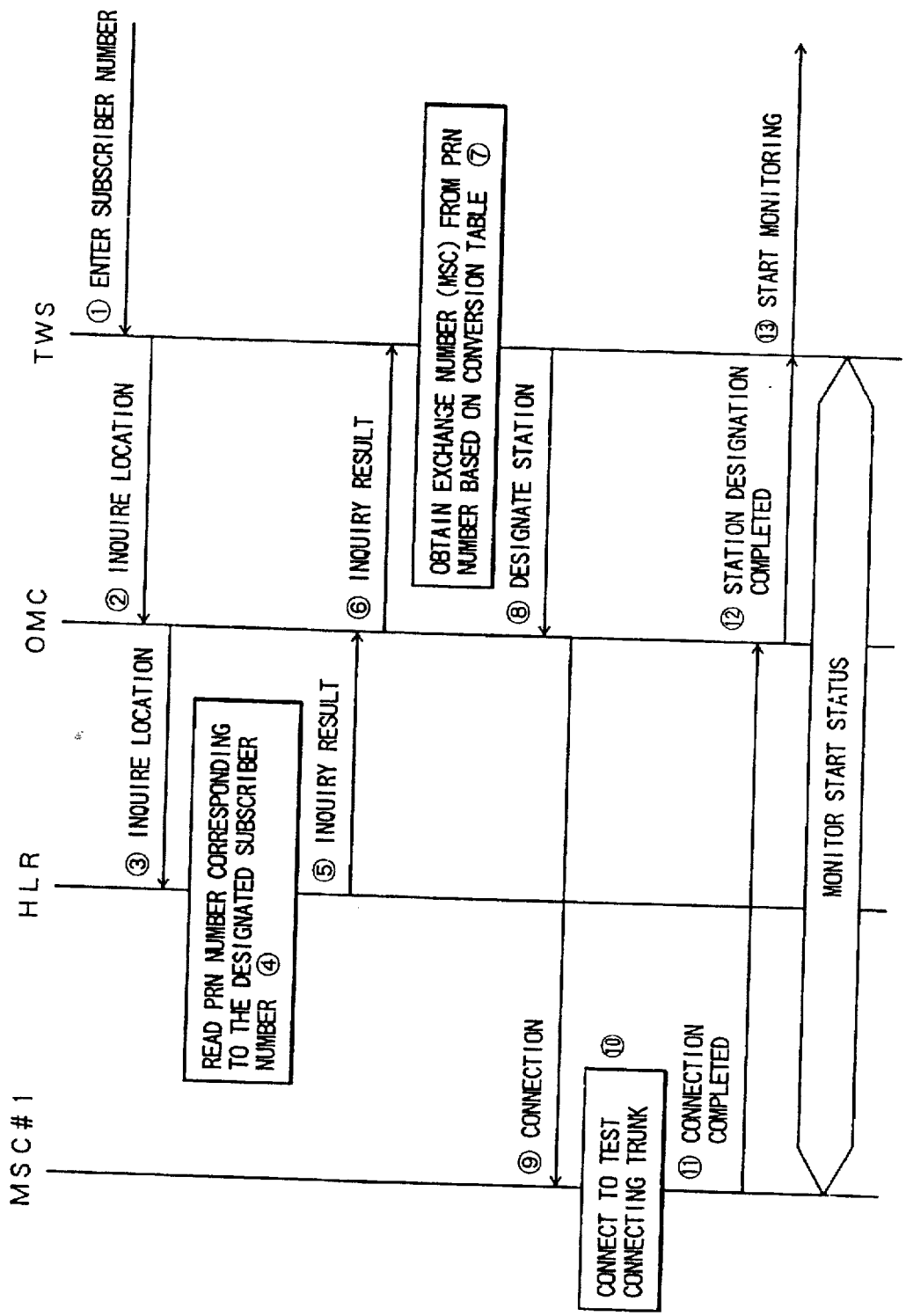

Procedures of setting the communication monitor in the mobile communications system according to this embodiment, which has the above-described structure, will be described below with reference to time arrow diagrams in FIGS. 2 and 8. In FIG. 2, messages are expressed by thin lines, and a monitor channel that is to be established finally is indicated by a thick line.

First, the operator enters the subscriber number of a mobile station 1 to be monitored through the keyboard of the test work station 8 (step 1).

Then, this subscriber number is put in a location inquiry command that inquires the current location of the mobile station 1 and the command is sent to the operation and maintenance center 7 (step 2).

Upon reception of this location inquiry command, the operation and maintenance center 7 transfers the command to the home location register 9 (step 3).

When receiving this command, the home location register 9 starts the retrieval task. More specifically, the home location register 9 searches the memory contents for the registered subscriber data based on the subscriber number included in the location inquiry command. Then, the home location register 9 acquires the position data (PRN number) corresponding to the subscriber number as the searching result (step 4).

The home location register 9 sends the acquired position data to the operation and maintenance center 7 (step 5).

The operation and maintenance center 7 transfers the received position data directly to the test work station 8 (step 6).

Having received the position data, the test work station 8 refers to the conversion table shown in FIG. 3 to obtain the number of the mobile service switching center 4 (MSC number) which covers the location indicated by this PRN number, from the PRN number included in the position data (step 7). This table reference is automatically executed by the test work station 8 and does not involve the manual work by the operator.

When the reference to the number of the mobile service switching center 4 is completed, the test work station 8 combines the number of the mobile service switching center 4 as an anchor obtained by the table reference and the subscriber number into a station designation command, and transmits this station designation command to the operation and maintenance center 7 (step 8).

When receiving the station designation command, the operation and maintenance center 7 reads the number of the mobile service switching center 4 included in the received command and transfers a connection request command including the subscriber number to the mobile service switching center 4 that is indicated by this number (step 9).

The mobile service switching center 4 which has received this connection request command analyzes the subscriber number included in the connection request command to search for the STAP 5 to which a channel from the mobile station 1 corresponding to this subscriber number is established. Then, the mobile service switching center 4 establishes a channel between the STAP 5 and the test work station 8 (step 10).

When the connection of the channel is completed, the mobile service switching center 4 sends a connection complete message to the operation and maintenance center 7 (step 11).

When the operation and maintenance center 7 confirms that the connection between the designated mobile service switching center 4 and the test work station 8 has been completed in the above manner, the center 7 sends a station designation complete message to the test work station 8 (step 12) to informs the operator of the monitoring being started. Monitoring starts in the above manner (step 13).

Although FIG., 2 shows as if the STAP 5 is directly connected to the operation and maintenance center 7, it is needless to say that both are connected via the automobile switching center 6 or fixed telephone communications network NW.

Figure 9:
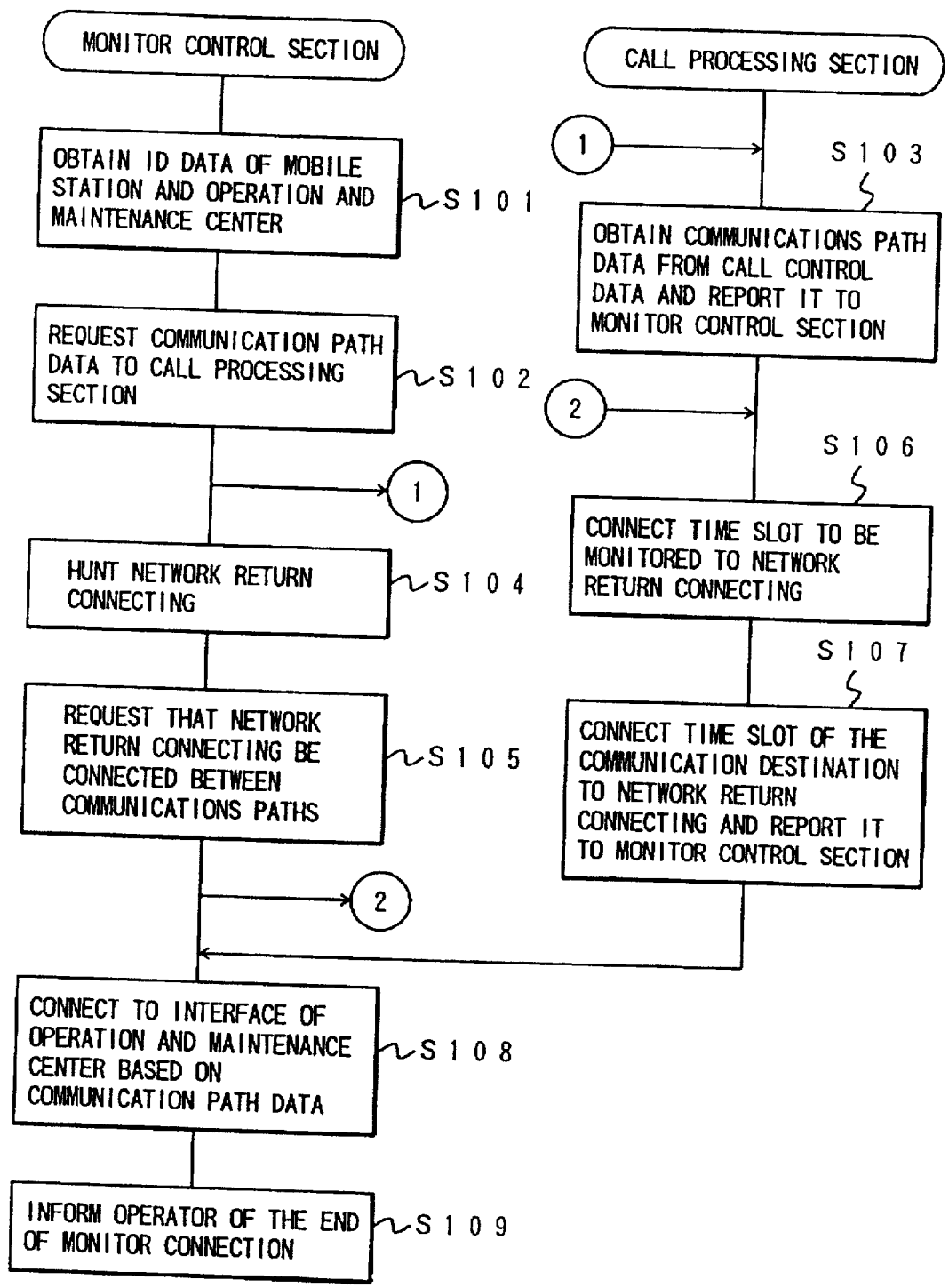
FIG. 9 is a flowchart illustrating a process executed by the mobile service switching center.

The connecting process that is executed by the mobile service switching center 4 in step 10 in FIG. 2 will now be described in detail. FIG. 9 shows the process executed by the mobile service switching center 4. The "call processing section" in FIG. 9 is the function of the call processor (CPR) 44 in FIG. 5, and the "monitor control section" is the function of the main processor (MPR) 40 in FIG. 5. This "monitor control section" functions in responsive to the "call processing section" of the call processor (CPR) 44 in accordance with an instruction from the operation and maintenance center 7.

The processing of the monitor control section starts upon reception of the call connection request command from the operation and maintenance center 7. First, the monitor control section acquires identification (ID) data of the mobile station 1 (that is "subscriber number (mobile station number)" or "device number of the mobile station") and the ID data of the operation and maintenance center 7 (step 101).

Then, the monitor control section asks the call processing section to obtain communication path data based on the ID data of the mobile station (step S102).

Upon reception of this request, the call processing section starts the process. The call processing section acquires the communication path data based on the ID data and reports the path data to the monitor control section (step S103). The communication path data obtained in step S103 are the following ① to ③.

① Terminal data of the mobile station 1 to be monitored: that is, the time slot between this mobile service switching center (MSC #1) 4 and the mobile base station (MBS1) 2, or if the mobile station 1 is located in the control zone of another mobile service switching center (MSC #2) 4, the time slot of the trunk between this mobile service switching center (MSC #1) 4 and said another mobile service switching center (MSC #2) 4.

② Terminal data of communication destination: that is, if the communication destination is a mobile station 1, the time slot between this mobile service switching center (MSC #1) 4 and the destination mobile base station (MBS2) 2 as in the case of the above ①, or if the destination mobile station 1 is located in the control zone of another mobile service switching center (MSC #2) 4, the time slot of the trunk between this mobile service switching center (MSC #1) 4 and said another mobile service switching center (MSC #2) 4, or if the destination is not a mobile station 1, the time slot of a trunk between this mobile service switching center (MSC #1) 4 and a fixed network.

③ Inner time slot: path data connecting the time slots specified by the matter of the above ① and ②.

Figure 10:
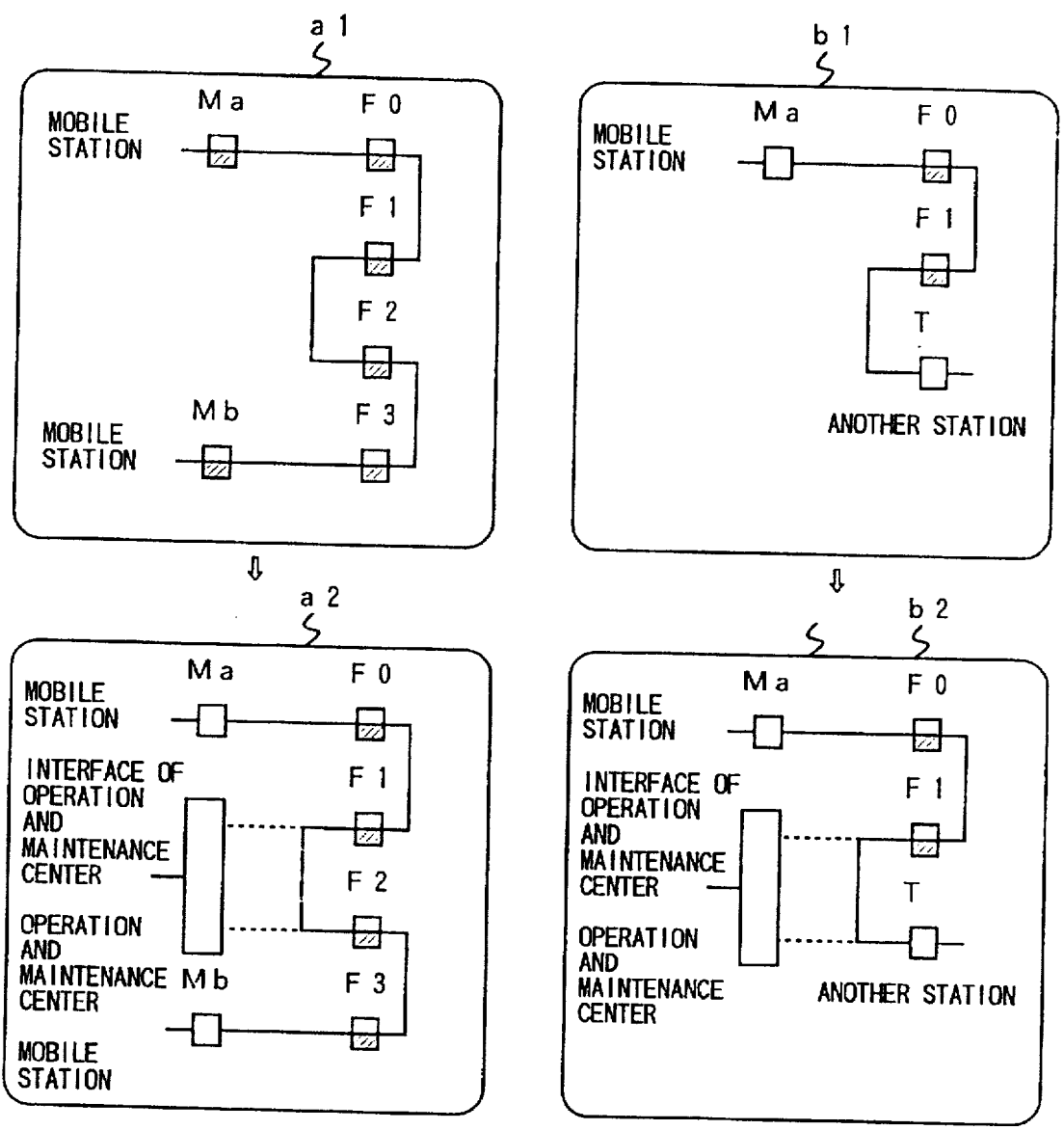
FIG. 10 is a diagram for explaining the connection of a communications path.

The path statuses at this time are illustrated in a1 and b1 in FIG. 10.

The monitor control section hunts the network return connecting 5e (step S104), and requests the call processing section to insert the network return connecting 5e in the communication path obtained in step S102 (step S105). When the communication between mobile stations is enabled by this mobile service switching center (MSC #1) 4, two network returns are hunted.

The call processing section establishes path connection between the time slot to be monitored and the network return connecting 5e in accordance with the request in the aforementioned step S105 (step S106). Subsequently, the call processing section establishes path connection between the time slot of the communication destination and the network return connecting 5e, and reports new communication path data to the monitor control section (step S107). In this case, two different processes are executed as follows (A and B) depending on the type of the communication destination.

(A) When the communication destination is located in a fixed network or is a mobile station 1 which is called by another mobile service switching center 4, the time slot on the communication destination side is a trunk between stations. The following are the control procedures to change the path in this case.

① The inner time slot is hunted again and a path connection is established in accordance with the relation between the time slot to be monitored and the network return connecting 5e. If it is unnecessary to hunt the inner time slot again, only the path connection is changed.

② The path that has become unnecessary in ① above is set free.

③ The inner time slot is hunted again and a path connection is established in accordance with the relation between the time slot on the communication destination side and the network return connecting 5e.

(B) When the communication destination is a mobile station 1 and the processes for calling this mobile station 1 and the mobile station 1 to be monitored are executed by the same mobile service switching center 4, the time slot on the communication destination side is a channel between the mobile service switching center 4 and the mobile base station 2 (to which the mobile station of the communication destination is connected). The following are the control procedures to change the path in this case.

① The inner time slot is hunted again and a path connection is established in accordance with the relation between the time slot to be monitored and the network return connecting 5e. If it is unnecessary to hunt the inner time slot again, only the path connection is changed.

② The path that has become unnecessary in ① above is set free.

③ The inner time slot is hunted again and a path connection is established in accordance with the relation between the time slot on the communication destination side and the network return connecting 5e.

④ The inner time slot is hunted and a path connection is established in accordance with the relation between two network returns connecting 5e.

When the process in step S107 is completed, the monitor control section connects the communication path to the interface for the operation and maintenance center 7 using the multiplexing function of the switching device (channel controller 42 and digital switch 43) based on the communication path data obtained in the aforementioned step S105 (step S108). The path statuses at this time are illustrated in a2 and b2 in FIG. 10.

Finally, the monitor control section informs the operation and maintenance center 7 of the end of the monitor connection (step S109; step 11 in FIG. 2).

Advantage of Second Embodiment

According to the second embodiment, what the operator should perform is just the first entry of the subscriber number, and the subsequent procedures are automatically executed. It is therefore easy to make the monitor connection.

Third Embodiment

Structure of Mobile Communications System

Figure 11:
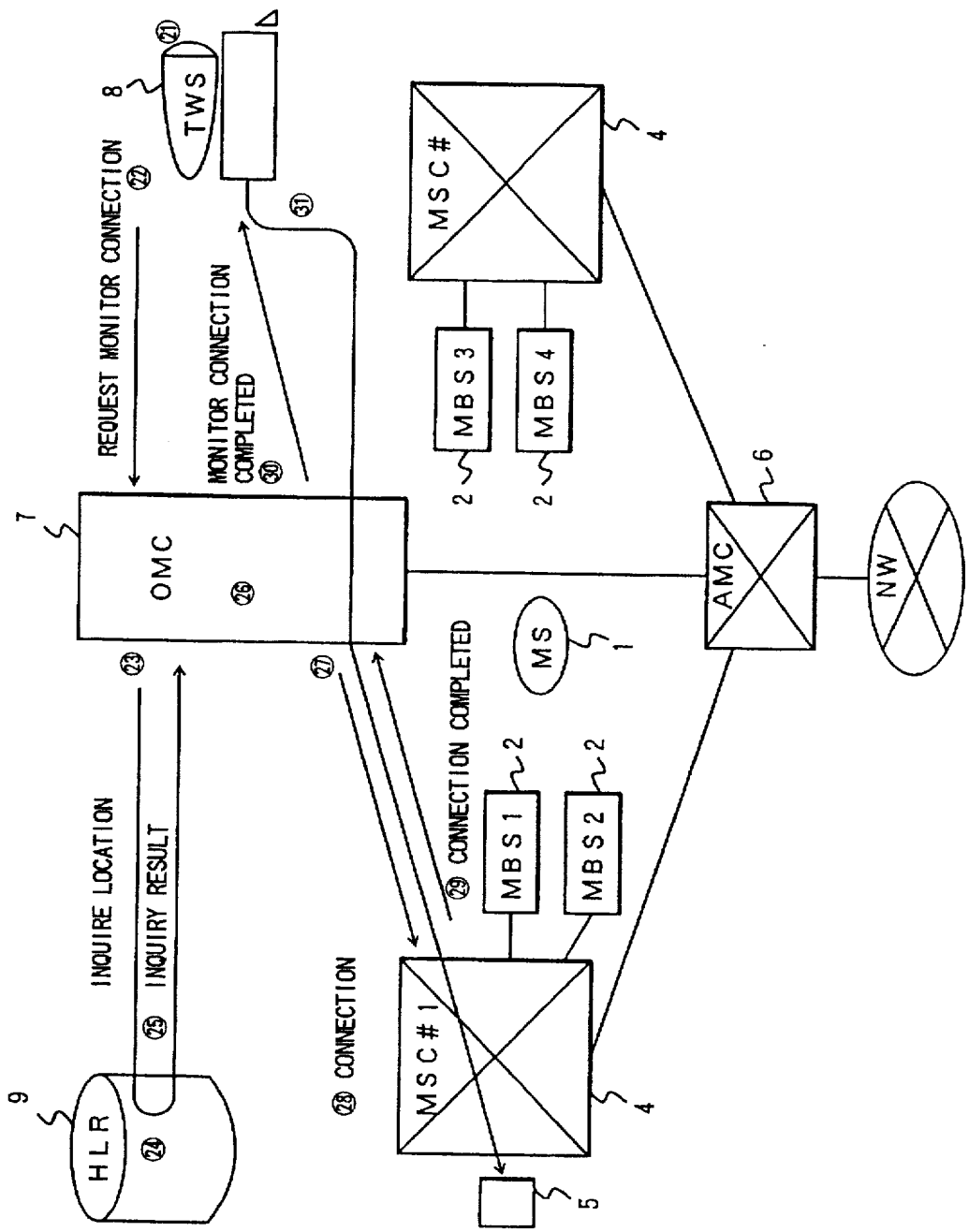
FIG. 11 is a schematic diagram showing the schematic structure of a mobile communications system for which a mobile communications monitor system according to a third embodiment of the present invention is adapted.

FIG. 11 is a schematic diagram of a mobile communications system for which a mobile communications monitor system according to a third embodiment of the present invention is adapted. Since the structure of the mobile communications system according to the third embodiment is substantially the same as that of the second embodiment, the same reference numerals as used for the second embodiments are also used in the following description of the third embodiment. In the third embodiment, the mobile communications system in which this invention is embodied the system of Nippon Telegraph and Telephone Corporation (NTT) currently used in Japan. This NTT system mainly comprises an automobile switching center (AMC) 6 connected to an unillustrated radio center (RC) of a fixed communications network NW, a plurality of mobile service switching centers (MSC) 4 connected via relay channels to this automobile switching center 6, and a plurality of mobile base stations (MBS) 2 connected via connecting lines to the individual mobile service switching centers 4. This system structure allows communications between mobile stations 1 located within a service area of the system and between any mobile station 1 and a fixed telephone. This mobile communications system is a so-called small-zone system.

In this mobile communications system, a single operation and maintenance center (OMC) 7 is connected to all the mobile service switching centers 4 via the automobile switching center 6. Connected to this operation and maintenance center 7 are a test work station (TWS) 8 and a home location register (HLR) 9.

The individual portions constituting this mobile communications system will now be discussed in detail.

Operation and Maintenance Center

Figure 12:
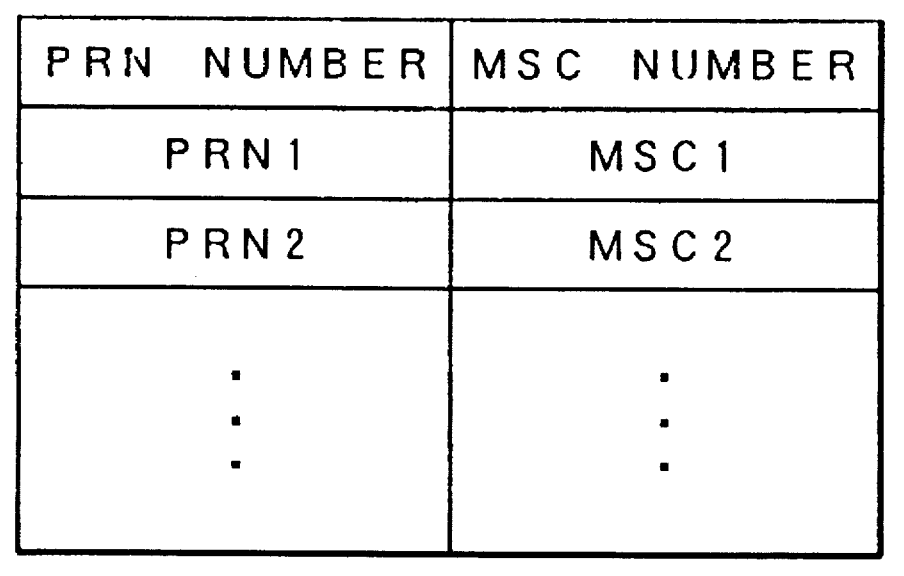

The operation and maintenance center 7 as a monitor device can monitor the contents of communications executed via the individual mobile service switching centers 4. The operation and maintenance center 7 accesses the each mobile service switching center 4 in accordance with a command from the test work station 8. The operation and maintanance center 7 enters the channel of the communication executed by the mobile station 1 designed by the test work station 8, making 1:2 connection. The operation and maintenance center 7 extracts voice signals in this communication. Further, the operation and maintenance center 7 accesses the home location register 9 in accordance with a command from the test work station 8 to retrieve the position data about the mobile station 1 from the register 9. Based on the position data informed by the home location register 9, the operation and maintenance center 7 automatically retrieves the mobile service switching center 4 which covers the area indicated by this position data. The operation and maintenance center 7 has a conversion table as shown in FIG. 12 to execute this retrieval. This conversion table has position data (PRN numbers (station numbers)) and MSC numbers (numbers of the mobile service switching centers 4) in one to one association. By searching this conversion table for a specific PRN number, therefore, the MSC number associated with that PRN number can easily be retrieved.

Test Work Station

The test work station 8 as the mobile-station specifying data input device is a work station which is equipped with a computer body, a keyboard and a display. This test work station 8 receives the subscriber number of the mobile station 1 to be monitored by the operator and transmits this subscriber number to the operation and maintenance center 7.

Mobile Station

The mobile station (MS) 1 as a mobile communications station is a user terminal, such as an automobile telephone or a portable telephone. That is, this mobile station 1 generally has a power supply and a radio unit, which can transmit a control signal and a communications signal on a radio wave and can receive the control signal and communications signal superimposed on a radio wave transmitted from the mobile base station 2. This mobile station 1 can freely move outside the service area of the mobile communications system as well as within the service area.

Mobile Base Station

The mobile base station 2 is a radio equipment which receives a radio wave from such a mobile station 1 and transmits a radio wave to the mobile station 1. To prevent radio waves transmitted from or received by a plurality of mobile base stations 2 from being mixed and to independently use a radio wave of the same frequency within a plurality of areas to increase the number of channels, each mobile base station 2 is designed in such a way that its output is suppressed to a relative low value (25 W) to narrow the radio zone which each mobile base station 2 covers and that a certain distance is secured between adjoining mobile base stations 2. The frequency band which each mobile base station 2 uses is given about 15 MHz for both transmission and reception. The number of subbands obtained by dividing this frequency band is the number of channels that each mobile base station 2 can establish.

Mobile Service Switching Center

Each mobile service switching center 4 as an exchange is connected to a regional group of mobile base stations 2 via a communications channel. Each mobile service switching center 4 controls the connected mobile base stations 2 and accommodates the channels of those mobile base stations 2.

When the mobile service switching center 4 receives a call establishing request from a mobile station 1 radio-connected to any mobile base station 2 under the control of this center 4 to establish communication with another mobile station 1 located in the radio zone of any mobile base station 2 also under its own control (the latter mobile base station 2 may be the same as the former one or may be different from the former one), the mobile service switching center 4 connects those mobile stations 1 together to permit communication between them. When the mobile service switching center 4 receives a call requesting the establishment of communication between a mobile station 1 located within its own radio zone and a mobile station 1 located within an area that is covered by another mobile service switching center 4 or a fixed telephone, the mobile service switching center 4 establishes the communication via the automobile switching center 6.

Connected to this mobile service switching center 4 is a test connecting trunk 5 which establishes 1:2 connection between the communications channel for a mobile station 1 and another terminal and maintenance center 7 when the operation and maintenance center 7 is monitoring.

Since the specific structures of the mobile service switching center 4 and the STAP 5 are the same as those of the second embodiment, their descriptions will not be given here.

Home Location Register

The home location register 6 as the position data storage means stores the position data of the mobile station 1. As the mobile station 1 is mobile, unlike a terminal and an end office in a fixed network, the mobile station 1 and the mobile base station 2 do not have a fixed relation. In calling a specific mobile station 1, therefore, it is necessary to send call signals from all the mobile base stations 2 in whose radio zones the mobile station is likely to be located or to execute the simultaneous calling. To reduce the number of mobile base stations 1 which perform this simultaneous calling, the positions of the stand-by mobile stations 1 are detected and the results are registered in the home location register 6. This registration is executed at the time the mobile station 1 is powered on. That is, at the same time the mobile station 1 is powered on, the mobile station 1 generates a registration request signal (including data of the subscriber number) to the nearest mobile base station 2. The mobile base station 2 which has received this registration request signal sends the data to the home location register 9 via the operation and maintenance center 7. The home location register 9 which has received this data can recognize the position of the mobile station 1 by discriminating the mobile base station 2 that has transferred the data. To avoid the troublesome task of renewal, this position data is classified for each control zone which is a larger area and is stored in this form.

When the mobile station 1 moves out of one control zone, communication is conducted to update the position data registered in the home location register 6. More specifically, when the mobile service switching center 4 detects from the communication from a mobile station 1 that this mobile station 1 has moved out of the control zone where the mobile station 1 has been located first, the mobile service switching center 4 reports the control zone where the mobile station 1 has newly entered to the home location register 9. Upon reception of this communication, the home location register 9 updates the registered content.

Procedures of Setting Communication Monitor

Figure 13:
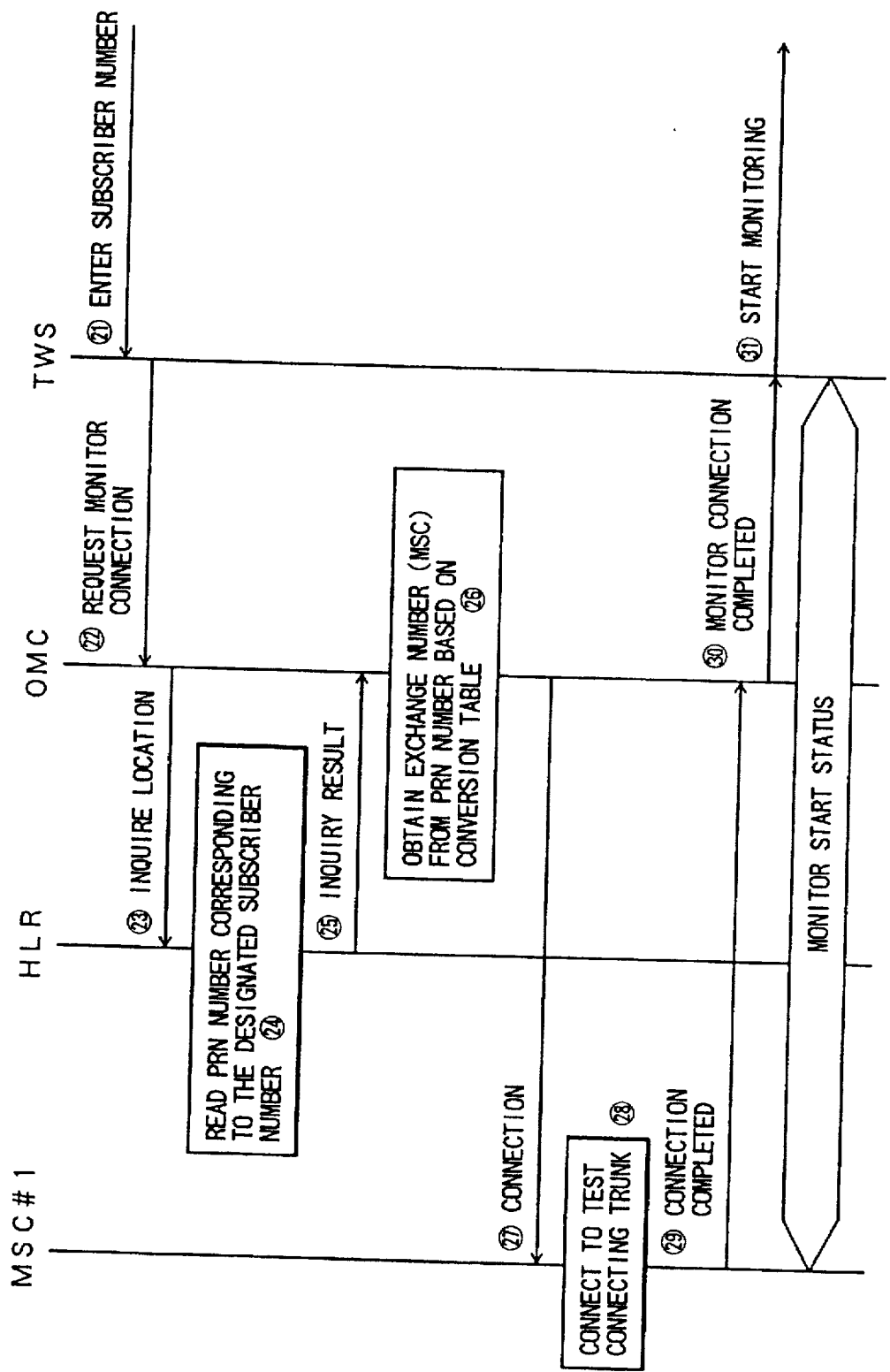
FIG. 13 is a time arrow diagram illustrating monitor connecting procedures that are executed by the mobile communications system shown in FIG. 11.

Procedures of setting the communication monitor in the mobile communications system according to this embodiment, which has the above-described structure, will be described below with reference to time arrow diagrams in FIGS. 11 and 13. In FIG. 11, messages are expressed by thin lines, and a monitor channel that is to be established finally is indicated by a thick line.

First, the operator enters the subscriber number of a mobile station 1 to be monitored through the keyboard of the test work station 8 (step 21).

Then, this subscriber number is put in a connection request command requesting that a monitor channel is connected to the mobile service switching center 4 which serves as an anchor with respect to the communication which the mobile station 1 is executing, and this command is sent to the operation and maintenance center 7 (step 22).

Upon reception of this connection request command, the operation and maintenance center 7 prepares a location inquiry command inquiring the current location of the mobile station 1 corresponding to the subscriber number included in the connection request command, and transfers the location inquiry command to the home location register 9 (step 23).

When receiving this command, the home location register 9 starts the retrieval task. More specifically, the home location register 9 searches the memory contents for the registered subscriber data based on the subscriber number included in the location inquiry command. Then, the home location register 9 acquires the position data (PRN: station number) corresponding to the subscriber number as the searching result (step 24).

The home location register 9 sends the acquired position data to the operation and maintenance center 7 (step 25).

The operation and maintenance center 7, which has received the position data, refers to the conversion table shown in FIG. 12 to obtain the number of the mobile service switching center 4 (MSC number) which covers the location indicated by this PRN number, from the PRN number included in the position data (step 26). This table reference is automatically executed by the operation and maintenance center 7 and does not involve the manual work by the operator.

When the reference to the number of the mobile service switching center 4 is completed, the operation and maintenance center 7 sends the connection request command to the mobile service switching center 4 specified by the number of the mobile service switching center 4 serving as an anchor obtained by the table reference (step 27).

The mobile service switching center 4 which has received this connection request command analyzes the subscriber number included in the connection request command to search for the STAP 5 to which a channel from the mobile station 1 corresponding to this subscriber number is established. Then, the mobile service switching center 4 establishes a channel between the STAP 5 and the test work station 8 (step 28).

When this connection of the channel is completed, the mobile service switching center 4 sends a connection complete message to the operation and maintenance center 7 (step 29).

When the operation and maintenance center 7 confirms that the connection between the designated mobile service switching center 4 and the test work station 8 has been completed in the above manner, the center 7 sends a station designation complete message to the test work station 8 (step 30) to informs the operator of the monitoring being started. Monitoring starts in the above manner (step 31).

Although FIG. 11 shows as if the STAP 5 is directly connected to the operation and maintenance center 7, it is needless to say that both are connected via the automobile switching center 6 or fixed telephone communications network NW.

The details of the connecting process executed in step 28 conform to FIGS. 9 and 10 explained for the second embodiment, so that its description will not be repeated.

Advantage of Third Embodiment

According to the third embodiment, what the operator should perform is Just the first entry of the subscriber number, and the subsequent procedures are automatically executed. It is therefore easy to make the monitor connection.

Fourth Embodiment

Structure of Mobile Communications System

Figure 14:
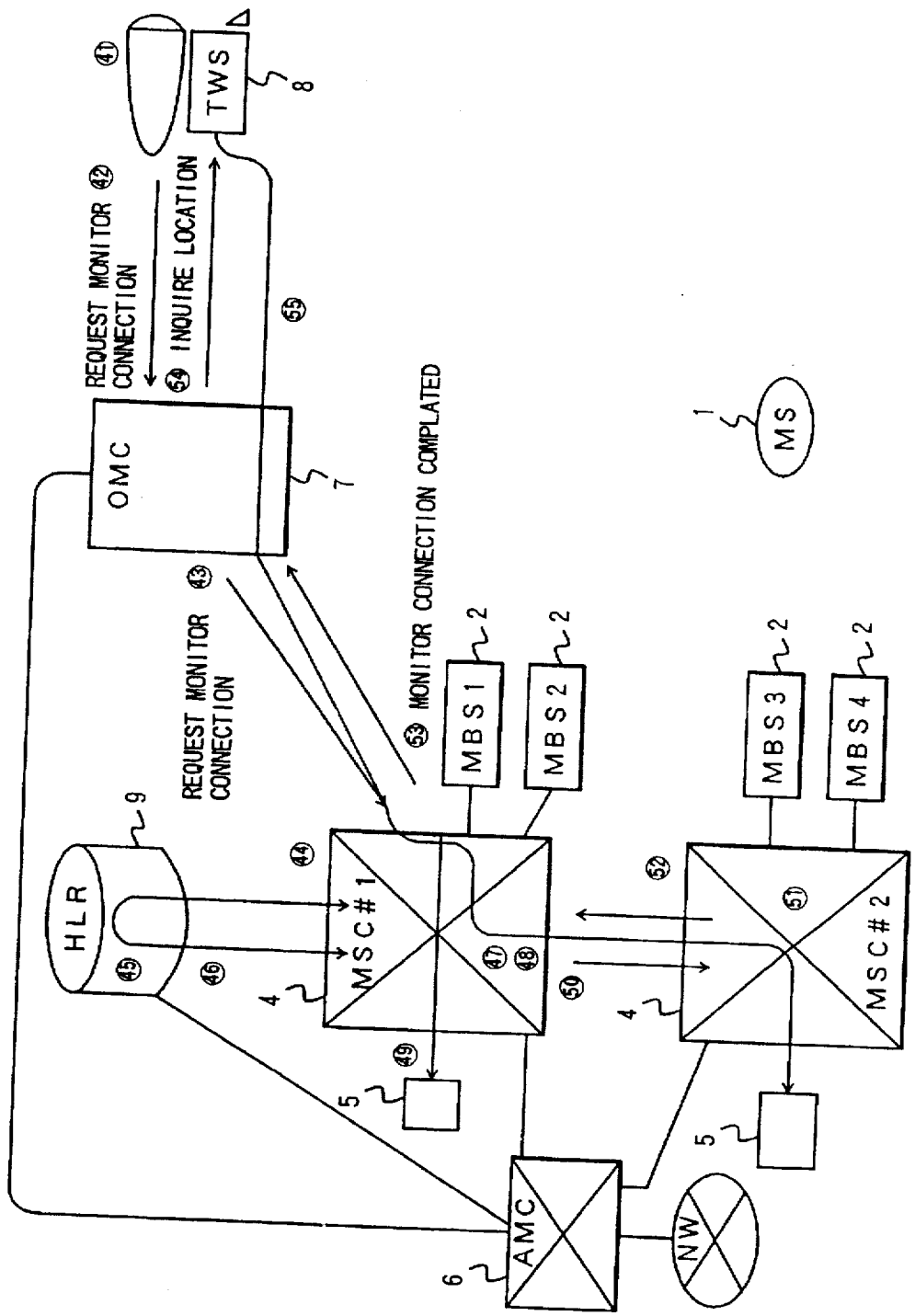
FIG. 14 is a schematic diagram showing the schematic structure of a mobile communications system for which a mobile communications monitor system according to a fourth embodiment of the present invention is adapted.

FIG. 14 is a schematic diagram of a mobile communications system for which a mobile communications monitor system according to a fourth embodiment of the present invention is adapted. Since the structure of the mobile communications system according to the fourth embodiment is substantially the same as that of the second embodiment, the same reference numerals as used for the second embodiments are also used in the following description of the fourth embodiment. In the fourth embodiment, the mobile communications system in which this invention is embodied is the NTT system currently used in Japan. This NTT system mainly comprises an automobile switching Center (AMC) 6 connected to an unillustrated radio center (RC) of a fixed communications network NW, a plurality of mobile service switching centers (MSC) 4 connected via relay channels to this automobile switching center 6, and a plurality of mobile base stations (MBS) 2 connected via connecting lines to the individual mobile service switching centers 4. This system structure allows communications between mobile stations 1 located within a service area of the system and between any mobile station 1 and a fixed telephone. This mobile communications system is a so-called small-zone system.

In this mobile communications system, a single operation and maintenance center (OMC) 7 is connected to all the mobile service switching centers 4 via the automobile switching center 6. Connected to this operation and maintenance center 7 is a test work station (TWS) 8.

In this mobile communications system, a single home location register (HLR) 9 is connected to all the mobile service switching centers 4 via the automobile switching center 6.

The individual portions constituting this mobile communications system will now be discussed in detail.

Operation and Maintenance Center

The operation and maintenance center 7 as a monitor device can monitor the contents of communications executed via the individual mobile service switching centers 4. The operation and maintenance center 7 accesses the each mobile service switching center 4 in accordance with a command from the test work station 8. The operation and maintenance center 7 enters the channel of the communication executed by the mobile station 1 designed by the test work station 8, making 1:2 connection. The operation and maintenance center 7 extracts voice signals in this communication.

Test Work Station

The test work station 8 as the mobile-station specifying data input device is a work station which is equipped with a computer body, a keyboard and a display. This test work station 8 receives the subscriber number of the mobile station 1 to be monitored by the operator and transmits this subscriber number to the operation and maintenance center 7.

Mobile Station

The mobile station (MS) 1 as a mobile communications station is a user terminal, such as an automobile telephone or a portable telephone. That is, this mobile station 1 generally has a power supply and a radio unit, which can transmit a control signal and a communications signal on a radio wave and can receive the control signal and communications signal superimposed on a radio wave transmitted from the mobile base station 2. This mobile station 1 can freely move outside the service area of the mobile communications system as well as within the service area.

Mobile Base Station

The mobile base station 2 is a radio equipment which receives a radio wave from such a mobile station 1 and transmits a radio wave to the mobile station 1. To prevent radio waves transmitted from or received by a plurality of mobile base stations 2 from being mixed and to independently use a radio wave of the same frequency within a plurality of areas to increase the number of channels, each mobile base station 2 is designed in such a way that its output is suppressed to a relative low value (25 W) to narrow the radio zone which each mobile base station 2 covers and that a certain distance is secured between adjoining mobile base stations 2. The frequency band which each mobile base station 2 uses is given about 15 MHz for both transmission and reception. The number of subbands obtained by dividing this frequency band is the number of channels that each mobile base station can establish.

Mobile Service Switching Center

Each mobile service switching center 4 as an exchange is connected to a regional group of mobile base stations 2 via a communications channel. Each mobile service switching center 4 controls the connected mobile base stations 2 and accommodates the channels of those mobile base stations 2.

When the mobile service switching center 4 receives a call establishing request from a mobile station 1 radio-connected to any mobile base station 2 under the control of this center 4 to establish communication with another mobile station 1 located in the radio zone of any mobile base station 2 also under its own control (the latter mobile base station 2 may be the same as the former one or may be different from the former one), the mobile service switching center 4 connects those mobile stations 1 together to permit communication between them. When the mobile service switching center 4 receives a call requesting the establishment of communication between a mobile station 1 located within its own radio zone and a mobile station 1 located within an area that is covered by another mobile service switching center 4 or a fixed telephone, the mobile service switching center 4 establishes the communication via the automobile switching center 6.

Connected to this mobile service switching center 4 is a test connecting trunk 5 which establishes 1:2 connection between the communications channel for a mobile station 1 and another terminal and maintenance center 7 when the operation and maintenance center 7 is monitoring.

Figure 15:
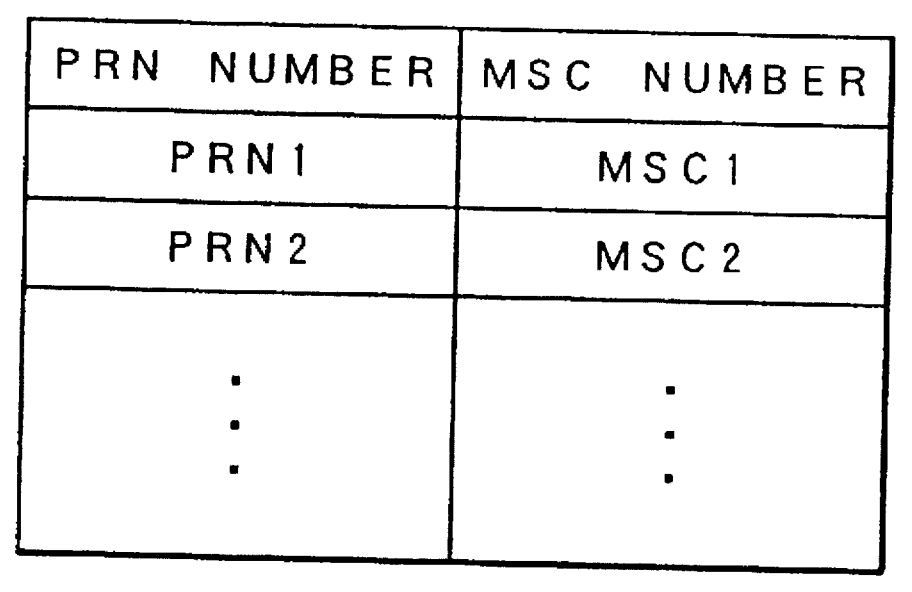

The mobile service switching center 4 accesses the home location register 9 in accordance with a command from the operation and maintenance center 7, to retrieve the position data about the mobile station 1 from the register 9. Based on the position data is formed by the home location register 9, the mobile service switching center 4 automatically retrieves the mobile service switching center 4 which covers the area indicated by this position data. The mobile service switching center 4 has a conversion table as shown in FIG. 15 to execute this retrieval. This conversion table has position data (PRN numbers (station numbers)) and MSC numbers (numbers of the mobile service switching centers 4) in one to one association. By searching this conversion table for a specific PRN number, therefore, the MSC number associated with that PRN number can easily be retrieved.

Since the specific structures of the mobile service switching center 4 and the test connecting trunk 5 are the same as those of the second embodiment, their descriptions will not be given here.

Home Location Register The home location register 6 as the position data storage means stores the position data of the mobile station 1. As the mobile station 1 is mobile, unlike a terminal and an end office in a fixed network, the mobile station 1 and the mobile base station 2 do not have a fixed relation. In calling a specific mobile station 1, therefore, it is necessary to send call signals from all the mobile base stations 2 in whose radio zones the mobile station is likely to be located or to execute the simultaneous calling. To reduce the number of mobile base stations 1 which perform this simultaneous calling, the positions of the stand-by mobile stations 1 are detected and the results are registered in the home location register 6. This registration is executed at the time the mobile station 1 is powered on. That is, at the same time the mobile station 1 is powered on, the mobile station 1 generates a registration request signal (including data of the subscriber number) to the nearest mobile base station 2. The mobile base station 2 which has received this registration request signal sends the data to the home location register 9 via the operation and maintenance center 7. The home location register 9 which has received this data can recognize the position of the mobile station 1 by discriminating the mobile base station 2 that has transferred the data. To avoid the troublesome task of renewal, this position data is classified for each control zone which is a larger area and is stored in this form.

When the mobile station 1 moves out of one control zone, communication is conducted to update the position data registered in the home location register 6. More specifically, when the mobile service switching center 4 detects from the communication from a mobile station 1 that this mobile station 1 has moved out of the control zone where the mobile station 1 has been located first, the mobile service switching center 4 reports the control zone where the mobile station 1 has newly entered to the home location register 9. Upon reception of this communication, the home location register 9 updates the registered content.

Procedures of Setting Communication Monitor

Figure 16:
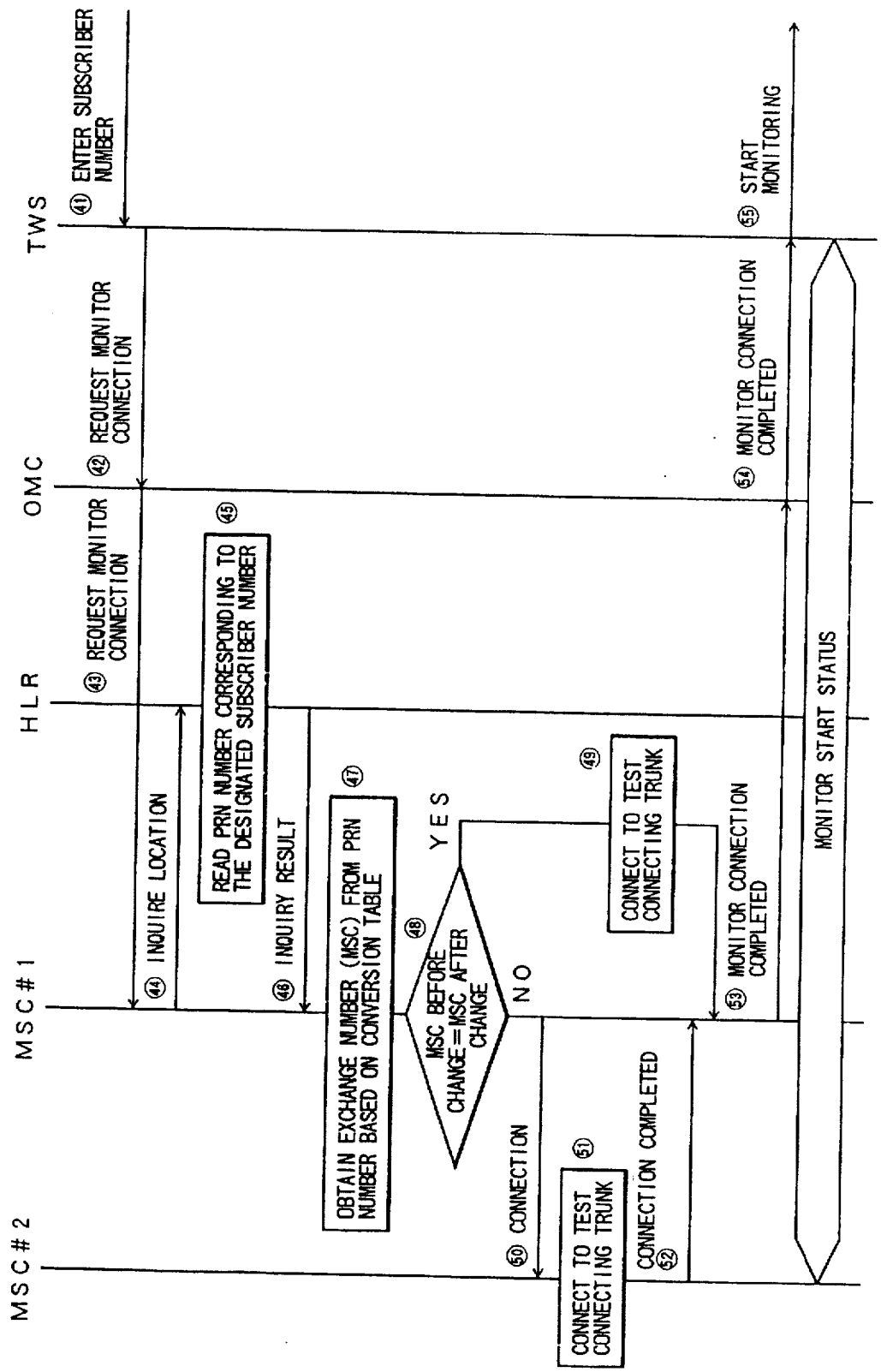
FIG. 16 is a time arrow diagram illustrating monitor connecting procedures that are executed by the mobile communications system shown in FIG. 14.
Figure 17:
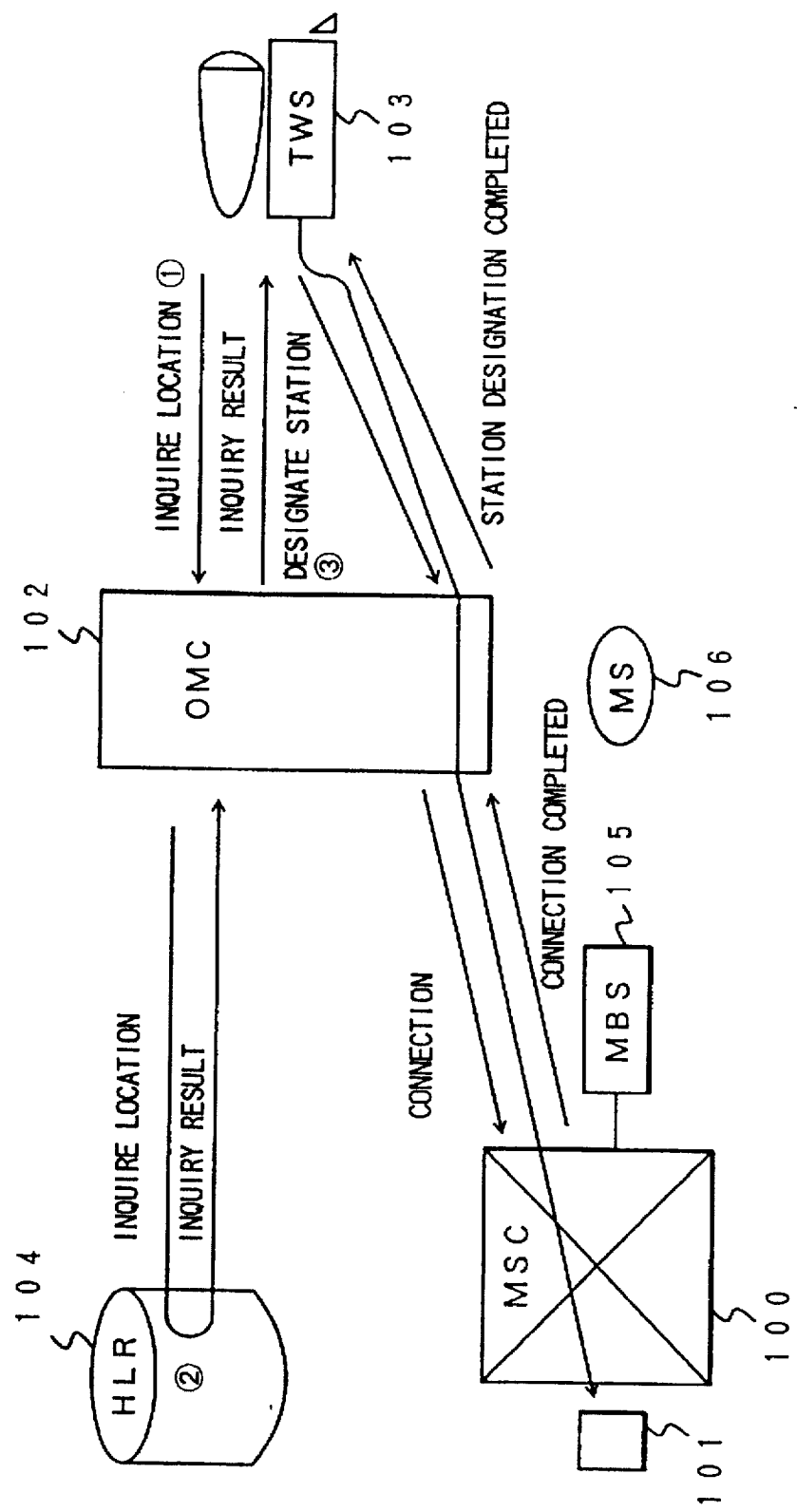
FIG. 17 is a diagram showing prior art.

Procedures of setting the communication monitor in the mobile communications system according to this embodiment, which has the above-described structure, will be described below with reference to time arrow diagrams in FIGS. 14 and 16. In FIG. 14, messages are expressed by thin lines, and a monitor channel that is to be established finally is indicated by a thick line.

First, the operator enters the subscriber number of a mobile station 1 to be monitored through the keyboard of the test work station 8 (step 41).

Then, this subscriber number is put in a connection request command requesting that a monitor channel connected to the mobile service switching center 4 which serves as an anchor with respect to the communication which the mobile station 1 is executing, and this command is sent to the operation and maintenance center 7 (step 42).

The operation and maintenance center 7, which has received this connection request command, transfers this command to an arbitrary mobile service switching center (MSC #1) 4 (step 43).

Upon reception of this connection request command, the mobile service switching center (MSC #1) 4 prepares a location inquiry command inquiring the current location of the mobile station 1 corresponding to the subscriber number included in the connection request command, and transfers the location inquiry command to the home location register 9 (step 44).

When receiving this command, the home location register 9 starts the retrieval task. More specifically, the home location register 9 searches the memory contents for the registered subscriber data based on the subscriber number included in the location inquiry command. Then, the hole location register 9 acquires the position data (PRN: station number) corresponding to the subscriber number as the searching result (step 45).

The home location register 9 sends the acquired position data to the mobile service switching center (MSC #1) 4 that has issued the location inquiry command (step 46).

The mobile service switching center (MSC #1) 4, which has received the position data, refers to the conversion table shown in FIG. 15 to obtain the number of the mobile service switching center (MSC #2) 4 (MSC number) which covers the location indicated by this PRN number, from the PRN number included in the position data (step 47). This table reference is automatically executed by the mobile service switching center (MSC #1) 4 and does not involve the manual work by the operator.

Next, the mobile service switching center (MSC #1) 4 compares its own MSC number (i.e., the MSC number before change), with the MSC number obtained in Step 47 (i.e., the MSC number after change) to determine if they match with each other (step 48).

If both MSC numbers match with each other, this mobile service switching center (MSC #1) 4 analyzes the subscriber number included in the connection request command to search for the test connecting trunk 5 to which a channel from the mobile station 1 corresponding to this subscriber number is established. Then, the mobile service switching center (MSC #1) 4 establishes a channel between the test connecting trunk 5 and the test work station 8 (step 49).

If it is determined in step 48 that both MSC numbers do not match with each other, the mobile service switching center (MSC #1), 4, which has received the connection request command, sends the connection request command to the mobile service switching center (MSC #2) 4 corresponding to the MSC number obtained by the table reference in step 47 (step 50). This mobile service switching center (MaC #2) 4 is serving as an anchor.

The mobile service switching center (MSC #2) 4 as the anchor, which has received this connection request command, analyzes the subscriber number included in the connection request command to search for the test connecting trunk 5 to which a channel from the mobile station 1 corresponding to this subscriber number is established. Then, the mobile service switching center (MSC #2) 4 establishes a channel between the test connecting trunk 5 and the test work station 8 (step 51).

When this connection of the channel is completed, the mobile service switching center (MSC #2) 4 returns a connection complete message to the mobile Service switching center (MSC #1) 4 which has issued the connection request command (step 52).

In both cases where both MSC numbers match with each other and where those MSC numbers do not match with each other, the mobile service switching center (MSC #1)4 subsequently sends a connection complete message to the operation and maintenance center 7 (step 53).

When the operation and maintenance center 7 confirms that the connection between the designated mobile service switching center 4 and the test work station 8 has been completed in the above manner, the center 7 sends a station designation complete message to the test work station 8 (step 54) to informs the operator of the monitoring being started. Monitoring starts in the above manner (step 55).

Although FIG. 14 shows as if the test connecting trunk 5 is directly connected to the operation and maintenance center 7, it is needless to say that both are connected via the automobile switching center 6 or fixed telephone communications network NW.

The details of the connecting process executed in step 49 and step 51 conform to FIGS. 9 and 10 explained for the second embodiment, so that its description will not be repeated.

Advantage of Fourth Embodiment

According to the fourth embodiment, what the operator should perform is just the first entry of the subscriber number, and the subsequent procedures are automatically executed. It is therefore easy to make the monitor connection.

In short, the mobile communications monitor system embodying the present invention can reduce the number of input tasks that should be performed on an end office.

This invention being thus described, it will be obvious that the same may be varied in same ways. Such variations are not to be regarded as a departure from the spirit and scope of the invention, and all such modifications would be obvious to one skilled in the art intended within the scope of the following claims.

What is claimed is:

1. A mobile communications monitor system comprising:

a plurality of exchanges for communicating with an arbitrary mobile station and for relaying the communication with said mobile station;

a monitor device, connected to said plurality of exchanges, for extracting contents of communications relayed by said connected exchanges;

mobile-station specifying data input device for inputting specifying data of a mobile station to be monitored, into said monitor device; and position data storage device, connected to said monitor device, for storing position data specifying locations of said mobile station, wherein:

when receiving said position data through said mobile-station specifying data input device, said monitor device reads position data of a mobile station, corresponding to said input specifying data, from said position data storage device and transmits said position data to said mobile-station specifying data input device, upon reception of said position data, said mobile-station specifying data input device automatically specifies an exchange whose service area covers a position indicated by said read position data, and reports said specified exchange to said monitor device, and when informed of said specified exchange, said monitor device orders said specified exchange to extract a content of the communication with the mobile station corresponding to said mobile-station specifying data from said specified exchange.

2. The mobile communications monitor system according to claim 1, wherein said mobile-station specifying data input device has a table in which a position indicated by said position data is associated with said exchange whose service area covers said position.

3. The mobile communications monitor system according to claim 1, wherein said position data storage device registers positions of individual mobile stations informed through communications with said mobile stations.

4. The mobile communications monitor system according to claim 3, wherein said plurality of exchanges are mutually connected by a higher-rank exchange.

5. The mobile communications monitor system according to claim 3, wherein said plurality of exchanges are connected to said monitor device.

6. A mobile communications monitor system comprising:

a plurality of exchanges for communicating with an arbitrary mobile station and for relaying the communication with said mobile station;

a monitor device connected to said plurality of exchanges for outputting contents of communications relayed by said connected exchanges;

mobile-station specifying data input device for inputting specifying data of a mobile station to be monitored, into said monitor device; and position data storage device, connected to said exchanges, for storing position data specifying locations of said mobile station, wherein:

when receiving said position data through said mobile-station specifying data input device, said monitor device transmits said input specifying data to any exchange, and an exchange which receives said mobile-station specifying data reads position data of a mobile station, corresponding to said received specifying data, from said position data storage device, automatically specifies an exchange whose service area covers a position indicated by said read position data, orders said specified exchange to extract a content of a communication from a mobile station corresponding to said specific data from said specified exchange, and relays the extracted content of the communication to the monitor device.

7. The mobile communications monitor system according to claim 6, wherein each of said exchanges has a table in which a position indicated by said position data is associated with said exchange whose service area covers said position.

8. The mobile communications monitor system according to claim 6, wherein said position data storage device registers positions of individual mobile stations informed through communications with said mobile stations.

9. The mobile communications monitor system according to claim 8, wherein said plurality of exchanges are mutually connected by a higher-rank exchange.

10. The mobile communications monitor system according to claim 8, wherein said plurality of exchanges are connected to said monitor device.

* * * * *